US009600076B2

(12) United States Patent
Levesque et al.

(10) Patent No.: US 9,600,076 B2
(45) Date of Patent: Mar. 21, 2017

(54) SYSTEMS AND METHODS FOR OBJECT MANIPULATION WITH HAPTIC FEEDBACK

(71) Applicant: Immersion Corporation, San Jose, CA (US)

(72) Inventors: Vincent Levesque, Montreal (CA); Wei Zhu, Verdun (CA); Eric Gervais, Montreal (CA); Fengtian An, Montreal (CA); Eric Lajeunesse, Saint-Hubert (CA); Johnny Maalouf, Montreal (CA)

(73) Assignee: Immersion Corporation, San Jose, CA (US)

( * ) Notice: Subject to any disclaimer, the term of this patent is extended or adjusted under 35 U.S.C. 154(b) by 72 days.

(21) Appl. No.: 14/577,461

(22) Filed: Dec. 19, 2014

(65) Prior Publication Data
US 2016/0179198 A1 Jun. 23, 2016

(51) Int. Cl.
H04B 3/36 (2006.01)
G06F 3/01 (2006.01)
G06F 1/16 (2006.01)

(52) U.S. Cl.
CPC .............. G06F 3/016 (2013.01); G06F 1/163 (2013.01); G06F 3/017 (2013.01)

(58) Field of Classification Search
CPC .......................... G06F 3/016; G06T 19/006
USPC .................. 340/407.1, 4.12, 7.6; 345/173
See application file for complete search history.

(56) References Cited

U.S. PATENT DOCUMENTS

| 6,115,482 | A | 9/2000 | Sears et al. |
|---|---|---|---|
| 6,477,448 | B1 | 11/2002 | Maruyama |
| 2004/0108995 | A1 | 6/2004 | Hoshino et al. |
| 2009/0051509 | A1 | 2/2009 | Hwang |
| 2009/0270045 | A1 | 10/2009 | Flaherty |
| 2011/0021272 | A1 | 1/2011 | Grant et al. |
| 2012/0028577 | A1 | 2/2012 | Rodriguez et al. |
| 2013/0314303 | A1 | 11/2013 | Osterhout et al. |
| 2014/0056461 | A1 | 2/2014 | Afshar |
| 2014/0139451 | A1 | 5/2014 | Levesque et al. |
| 2014/0266647 | A1* | 9/2014 | Visitacion ............... G08B 6/00 340/407.1 |

(Continued)

OTHER PUBLICATIONS

Bau et al., REVEL: Tactile feedback technology for augmented reality, ACM Trans. Graph. 31(4), Article 89 (Jul. 2012), 11 pages.

(Continued)

*Primary Examiner* — Toan N Pham
(74) *Attorney, Agent, or Firm* — Kilpatrick Townsend & Stockton LLP

(57) ABSTRACT

One illustrative computing device disclosed herein includes a sensor configured to detect a user interaction with a physical object and transmit a sensor signal associated with the user interaction. The illustrative computing device also includes a processor in communication with the sensor, the processor configured to: receive the sensor signal; determine a characteristic of the physical object based on the sensor signal; determine a haptic effect associated with the characteristic; and transmit a haptic signal associated with the haptic effect. The illustrative computing device further includes a haptic output device in communication with the processor, the haptic output device configured to receive the haptic signal and output the haptic effect.

22 Claims, 7 Drawing Sheets

(56) References Cited

U.S. PATENT DOCUMENTS

2014/0320393 A1* 10/2014 Modarres ............... G06F 3/017
   345/156
2014/0320431 A1   10/2014 Cruz-Hernandez et al.

OTHER PUBLICATIONS

Harrison, C. et al., TapSense: Enhancing finger interaction on touch surfaces, In the Proceedings of the 24$^{th}$ Annual ACM Symposium on User Interface Software and Technology, UIST'11. ACM, New York, 2011, 627-636.
Revel: programming the sense of touch, Disney Research Science at Play, web page at—http://www.disneyresearch.com/project/revel-programming-the-sense-of-touch/, as available via the Internet, 2012.
Sato, M. et al., Touche: Enhancing touch interaction on humans, screens, liquids, and everyday objects, CHI'12, May 5-10, 2012, 10 pages.
TapSense: enhancing finger interaction on touch surfaces, web page at http://www.chrisharrison.net/index.php/Research/TapSense, as available via the Internet, 2011.
Touche: touch and gesture sensing for the real world, Disney Research Science at Play, web page at http://www.disneyresearch.com/project/touche-touch-and-gesture-sensing-for-the-real-world/, as available via the Internet, 2012.
European Patent Office, Extended European Search Report, Application No. 15200963 dated May 3, 2016.
European Patent Office, Extended European Search Report, Application No. 15200964 dated Apr. 25, 2016.
United States Patent and Trademark Office, Office Action, U.S. Appl. No. 14/577,565 dated Jun. 1, 2016.

* cited by examiner

SYSTEMS AND METHODS FOR OBJECT MANIPULATION WITH HAPTIC FEEDBACK

CROSS REFERENCE TO RELATED APPLICATIONS

This application is related to U.S. patent application Ser. No. 14/577,565, filed the same day as the present application and entitled "Systems and Methods for Haptically-Enabled Interactions with Objects," the entirety of which is hereby incorporated herein by reference.

FIELD OF THE INVENTION

The present invention relates to the field of user interface devices. More specifically, the present invention relates to object manipulation with haptic feedback.

BACKGROUND

Humans are increasingly using computer-based systems for a variety of every-day activities. For example, consumers may use mobile devices (e.g., smartphones) to read reviews about a product or compare prices of a product at different stores while shopping. It may be difficult and time consuming, however, for a consumer to interact with the small user interface (e.g., touchscreen display) of a mobile device to obtain relevant information while shopping. Thus, there is a need for an improved user interface that can provide such information to users quickly and easily. It may be desirable to use haptic feedback (e.g., mechanical vibrations) to improve such user interfaces.

SUMMARY

Embodiments of the present disclosure comprise object manipulation with haptic feedback. In one embodiment, a computing device of the present disclosure may comprise: a sensor configured to detect a user interaction with a physical object and transmit a sensor signal associated with the user interaction. The computing device may also comprise a processor in communication with the sensor, the processor configured to: receive the sensor signal; determine a characteristic of the physical object based on the sensor signal; determine a haptic effect associated with the characteristic; and transmit a haptic signal associated with the haptic effect. The computing device may further comprise a haptic output device in communication with the processor, the haptic output device configured to receive the haptic signal and output the haptic effect.

In another embodiment, a method of the present disclosure may comprise: receiving a sensor signal from a sensor, wherein the sensor signal is associated with a user interaction with a physical object. The method may also comprise determining a characteristic of the physical object based on the sensor signal; and determining a haptic effect associated with the characteristic. The method may further comprise transmitting a haptic signal associated with the haptic effect to a haptic output device, wherein the haptic output device is configured to receive the haptic signal and output the haptic effect. Yet another embodiment comprises a computer-readable medium for implementing such a method.

These illustrative embodiments are mentioned not to limit or define the limits of the present subject matter, but to provide examples to aid understanding thereof. Further embodiments are discussed in the Detailed Description, and additional description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
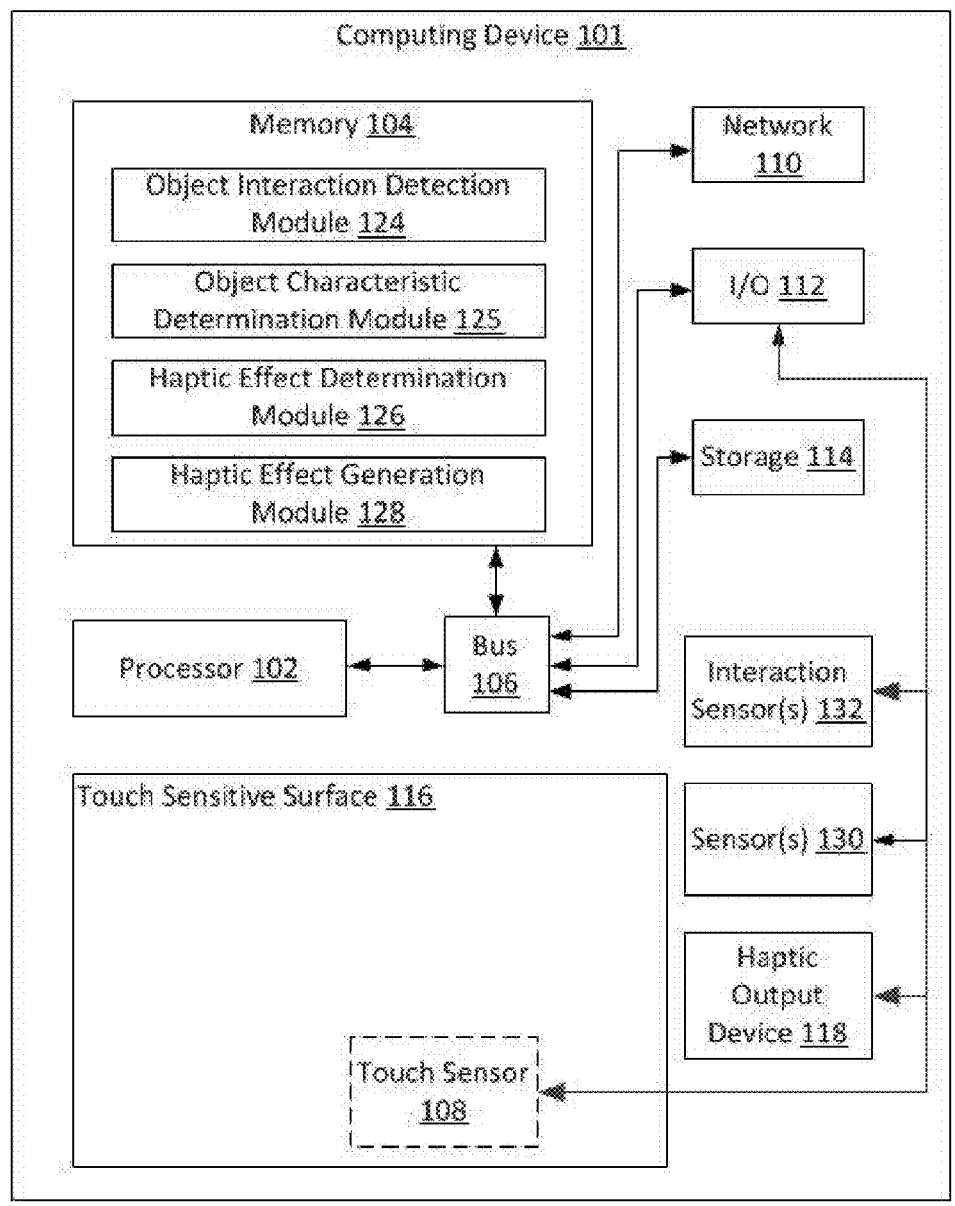
FIG. 1 is a block diagram showing a system for object manipulation with haptic feedback according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations that come within the scope of the appended claims and their equivalents.

Illustrative Examples of Object Manipulation with Haptic Feedback

One illustrative embodiment of the present disclosure comprises a computing device. The computing device comprises a processor coupled to a memory via a bus. In the illustrative embodiment, the computing device is configured to be worn by the user. For example, the computing device may comprise a ring configured to be worn on a user's finger.

In the illustrative embodiment, the computing device comprises a sensor configured to detect a user interaction with an object and transmit sensor signals to the processor. An object, as used herein, is anything (e.g., real or virtual) with which a user can potentially interact. For example, while browsing a grocery store, the user may touch a milk bottle. The computing device may detect, via the sensor, that the user touched the milk bottle. In the illustrative embodiment, the computing device determines a characteristic associated with the object based on the sensor signals. For example, the computing device may determine the brand of the milk and communicate with one or more servers (e.g., via the Internet) to determine the ingredients of the milk. Further, in the illustrative embodiment, the computing device determines if the characteristic associated with the object matches a criterion. For example, the user may be allergic to soy. The user may have input this allergen information into the computing device. The computing device may analyze the ingredients of the milk to determine if the milk contains soy. In the illustrative embodiment, if the characteristic matches the criteria, the computing device outputs a haptic effect via a haptic output device. For example, if the contents of the milk include soy, the computing device may output a haptic effect, e.g., a shock sensation. This may help the user make healthy purchasing decisions.

As another example, a user may be looking for a good deal at a discount clothing store. The discount clothing store may have a box of discount clothing that is all mixed together. The user may input her shirt size into the computing device. In the illustrative embodiment, as the user moves a hand through the box of mixed clothing, the computing device determines the barcode of (or a RFID code for) each piece of clothing that the user contacts. The computing device further communicates with a server (e.g., associated with the store) to determine the size of each piece of clothing based on the barcode (or RFID code). In the illustrative embodiment, if the size of a piece of clothing matches the user's shirt size, the computing device may output a haptic effect, e.g., a short vibration. This may help the user sort through a large quantity of products quickly and easily.

Another illustrative embodiment comprises a computing device configured to detect a user interaction with an object. The computing device then determines information such as the brand, manufacturer, distributer, and/or producer associated with the object. Further, in the illustrative embodiment, the computing device outputs a haptic effect associated with this information via a haptic output device.

For instance, a manufacturer may associate a unique haptic effect or series of haptic effects with the manufacturer's company. These unique haptic effects can be referred to as a "haptic brand." For example, Company A may have a haptic brand comprising a series of vibrations corresponding to the word "fun" in code, e.g., Morse code or another code. As another example, Company A may have a haptic brand comprising three vibration pulses, with each successive pulse having a larger amplitude than the previous pulse. Such a haptic brand may convey fun and excitement to a user. As still another example, Company A may have a haptic brand associated with audio or visual branding. In one such embodiment, Company A may have a haptic brand associated with the company's audio jingle. For instance, the haptic brand may include vibrations with magnitudes and/or frequencies associated with the notes in the audio jingle. The manufacturer may determine the haptic brand based on the target market of the manufacturer, the target market of a particular product, user perception of a haptic effect (e.g., whether the haptic effect is perceived as playful, serious, painful, or satisfying), and/or other criteria.

In the illustrative embodiment, the computing device outputs a haptic brand based on a user interaction with an object. For example, a user may be shopping for a new mobile device. The user may pick up a box for a smartphone that is manufactured by Company A. In the illustrative embodiment, the computing device determines that the user picked up an object manufactured by Company A. The computing device may determine (e.g., by consulting a lookup table or querying a server via the Internet) a haptic effect comprising vibrations corresponding to the word "fun" in Morse code. In the illustrative embodiment, the computing device then outputs the haptic effect. This may allow a user to determine that the manufacturer of the smartphone is Company A, even if the user is not visually focused on the product. The haptic brand may be an effective marketing tool, because it can allow a user to identify the product, even if the user is not visually focused on the product. It can also associate a unique physical interaction with a brand, which can help distinguish the brand and provide a more immersive marketing experience to the user.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Object Manipulation with Haptic Feedback

FIG. 1 is a block diagram showing a computing device 101 for object manipulation with haptic feedback according to one embodiment. In some embodiments, the computing device 101 may comprise a graspable device (e.g., a smartphone, tablet, e-reader, and/or a portable gaming device). In other embodiments, the computing device 101 may comprise a wearable device (e.g., a ring, a shoe, an armband, a sleeve, a jacket, glasses, a glove, a watch, a wristband, a bracelet, an article of clothing, a hat, a headband, and/or jewelry).

In some embodiments, the components (e.g., the processor 202, network 110, interaction sensor 132, sensor 130, etc.) of the computing device 101 may be integrated into a single housing. In other embodiments, the components may be distributed (e.g., among multiple housings or locations) and in electrical communication with one another. The computing device 101 may or may not comprise all of the components depicted in FIG. 1. For example, in some embodiments, the computing device 101 may comprise the processor 102, bus 106, memory 104, network 110, and haptic output device 118.

The computing device 101 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 101. In some embodiments, the computing device 101 may further comprise one or more network interface devices 110, input/output (I/O) interface components 112, and additional storage 114.

Network interface device 110 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, touch sensitive surfaces 116, keyboards, mice, speakers, microphones, buttons, and/or other hardware used to input data or output data. Storage 114 represents nonvolatile storage such as read-only memory, flash memory, ferroelectric RAM (F-RAM), magnetic, optical, or other storage media included in the computing device 101 or coupled to processor 102.

The computing device 101 may comprise a touch sensitive surface 116. Touch sensitive surface 116 represents any surface that is configured to sense tactile input of a user. One or more touch sensors 108 are configured to detect a touch in a touch area (e.g., when an object contacts a touch sensitive surface 116) and transmit signals associated with the touch to processor 102. Any suitable number, type, or arrangement of touch sensors 108 can be used. For example, resistive and/or capacitive sensors may be embedded in touch sensitive surface 116 and used to determine the location of a touch and other information, such as pressure, speed, and/or direction. As another example, optical sensors with a view of the touch sensitive surface 116 may be used to determine the touch position. As still another example, the touch sensitive surface 116 may comprise a LED (Light Emitting Diode) finger detector mounted on the side of a display. In some embodiments, touch sensor 108 may be configured to detect multiple aspects of the user interaction. For example, touch sensor 108 may detect both the speed and pressure of a user interaction, and incorporate this information into the signal transmitted to the processor 102.

In some embodiments, the computing device 101 comprises a touch-enabled display that combines a touch sensitive surface 116 and a display of the device. The touch sensitive surface 116 may correspond to the display exterior or one or more layers of material above components of the display. In other embodiments, touch sensitive surface 116 may not comprise (or otherwise correspond to) a display, depending on the particular configuration of the computing device 101.

In some embodiments, the computing device 101 comprises an interaction sensor 132. The interaction sensor 132 is configured to detect an interaction with the computing device 101 and/or an object (e.g., a product on a shelf in a store) by a user (e.g., using a finger, foot, hand, arm, head, leg, or other body part). In some embodiments, the user interaction may comprise touching the object, gesturing in real space, gesturing using the object (e.g., picking up the object and moving it in real space), and/or gesturing on an object (e.g., swiping a finger along a surface of the object). The interaction sensor 132 is further configured to transmit a sensor signal associated with the interaction to processor 102. The interaction sensor 132 may comprise an accelerometer, gyroscope, camera, radio frequency identification (RFID) tag or reader, indoor proximity system, NFC communication device, global positioning system (GPS) device, magnetometer, ultrasonic transducer, wireless interface (e.g., an IEEE 802.11 or Bluetooth interface), infrared sensor, depth sensor, and/or range sensor.

For example, in one embodiment, the interaction sensor 132 comprises a wireless interface that is configured to detect the strength of a wireless signal emitted by an object. The interaction sensor 132 may transmit a sensor signal associated with the wireless signal strength to the processor 102. Based on the wireless signal strength, the processor 102 may determine, for example, whether the computing device 101 is within a predefined distance of the object. If so, the processor 102 may determine an interaction (e.g., coming within a predefined distance of the object) occurred.

In another embodiment, the interaction sensor 132 comprises a camera oriented toward an object. A user may make a gesture (e.g., a check mark sign) in the air (e.g., with a body part, such as a finger, hand, arm, foot, head, or leg) near the object. The interaction sensor 132 may capture images associated with the gesture and transmit sensor signals to the processor 102. Based on the sensor signals, the processor 102 may determine that a user interaction occurred. The processor 102 may further analyze the sensor signals to determine the specific type of gesture that occurred. For example, the processor 102 may analyze the sensor signals and determine that the user made a check mark in the air with a finger.

In some embodiments, the interaction sensor 132 is external to computing device 101 and in wired or wireless communication with the computing device 101. For example, the interaction sensor 132 may comprise a camera associated with a wearable device (e.g., glasses or a tie) and in communication with the computing device 101. As another example, the interaction sensor 132 may comprise a 3D imaging system (e.g., the 3D imaging system commonly sold under the trademark Microsoft Kinect®) or a LED-based tracking system positioned external to the computing device 101 (e.g., on a shelf in a store) and in communication with the computing device 101.

The computing device 101 may further comprise one or more additional sensor(s) 130. The sensor(s) 130 are configured to transmit sensor signals to the processor 102. In some embodiments, the sensor 130 may comprise, for example, a humidity sensor, ambient light sensor, gyroscope, GPS unit, accelerometer, range sensor, depth sensor, biosensor, camera, or temperature sensor. In some embodiments, the sensor 130 may be external to computing device 101 and in wired or wireless communication with the computing device 101. For example, the sensor 130 may comprise a biosensor coupled to a wearable device (e.g., a ring or wristband). The biosensor may be configured to wirelessly transmit sensor signals to the computing device 101, which may be, for example, positioned in the user's pocket.

In some embodiments, the computing device 101 comprises a haptic output device 118 in communication with processor 102. The haptic output device 118 is configured to output a haptic effect in response to a haptic signal. In some embodiments, the haptic output device 118 is configured to output a haptic effect comprising a vibration, a change in a perceived coefficient of friction, a simulated texture, a change in temperature, a stroking sensation, an electro-tactile effect, or a surface deformation (e.g., a deformation of a surface associated with the computing device 101). Further, some haptic effects may use multiple haptic output devices 118 of the same or different types in sequence and/or in concert. Although a single haptic output device 118 is shown in FIG. 1, embodiments may use multiple haptic output devices 118 of the same or different type to produce haptic effects.

In some embodiments, the haptic output device 118 is external to computing device 101 and in communication with the computing device 101 (e.g., via wired interfaces such as Ethernet, USB, IEEE 1394, and/or wireless interfaces such as IEEE 802.11, Bluetooth, or radio interfaces). For example, the haptic output device 118 may associated with (e.g., coupled to) a wearable device and configured to receive haptic signals from the processor 102.

In some embodiments, the haptic output device 118 is configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 118 is configured to output a haptic effect modulating the perceived coefficient of friction of a surface associated with the haptic output device 118. In one embodiment, the haptic output device 118 comprises an ultrasonic actuator. An ultrasonic actuator may vibrate at an ultrasonic frequency, for example 20 kHz, increasing or reducing the perceived coefficient of an associated surface. In some embodiments, the ultrasonic actuator may comprise a piezo-electric material.

In some embodiments, the haptic output device 118 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101. In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 118. Varying the levels of attraction between the object and the conducting layer can vary the haptic effect perceived by a user.

In some embodiments, the haptic output device 118 comprises a deformation device configured to output a deformation haptic effect. The deformation haptic effect may comprise raising or lowering portions of a surface associated with the computing device 101. For example, if the computing device 101 is positioned within a product (e.g., in a store), the deformation haptic effect may comprise raising portions of a surface of a product's packaging to generate a bumpy texture. In some embodiments, the deformation haptic effect may comprise bending, folding, rolling, twisting, squeezing, flexing, changing the shape of, or otherwise deforming a surface associated with the computing device 101. For example, the deformation haptic effect may apply a force on the computing device 101 or a surface associated with the computing device 101, causing it to bend, fold, roll, twist, squeeze, flex, change shape, or otherwise deform. For instance, if the computing device 101 is positioned within a product's packaging, the deformation haptic effect may comprise bending the top of a product's packaging toward a user. This may notify the user that the product has characteristic that the user desires (e.g., that the product is on sale).

In some embodiments, the haptic output device 118 comprises fluid configured for outputting a deformation haptic effect (e.g., for bending or deforming the computing device 101 or a surface associated with the computing device 101). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 101 against deformation. In some embodiments, one or more wires may be embedded in or coupled to the smart gel. As current runs through the wires, heat is emitted, causing the smart gel to expand or contract. This may cause the computing device 101 or a surface associated with the computing device 101 to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 101 or a surface associated with the computing device 101 to deform.

In some embodiments, the haptic output device 118 comprises a mechanical deformation device. For example, in some embodiments, the haptic output device 118 may comprise an actuator coupled to an arm that rotates a deformation component. The deformation component may comprise, for example, an oval, starburst, or corrugated shape. The deformation component may be configured to move a surface associated with the computing device 101 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 102, the actuator may rotate the deformation component. Rotating the deformation component may cause one or more portions of the surface to raise or lower. The deformation component may, in some embodiments, remain in this rotated state until the processor 102 signals the actuator to rotate the deformation component back to its original position.

Further, other techniques or methods can be used to deform a surface associated with the computing device 101. For example, the haptic output device 118 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 118 is deformed, for example, with a deforming mechanism (e.g., a motor coupled to wires), air or fluid pockets, local deformation of materials, resonant mechanical elements, piezoelectric materials, micro-electro-mechanical systems ("MEMS") elements or pumps, thermal fluid pockets, variable porosity membranes, or laminar flow modulation.

In some embodiments, the haptic output device 118 is configured to remotely project haptic effects to a user. For example, the haptic output device 118 may comprise one or more jets configured to emit materials (e.g., solids, liquids, gasses, or plasmas) toward the user (e.g., toward the back of the user's hand). In one such embodiment, the haptic output device 118 comprises a gas jet configured to emit puffs or streams of oxygen, nitrogen, carbon dioxide, or carbon monoxide with varying characteristics upon receipt of the haptic signal. As another example, the haptic output device 118 may comprise one or more ultrasonic transducers or speakers configured to project pressure waves in the direction of the user. In one such embodiment, upon the user interacting with an object, the processor 102 may cause the haptic output device 118 to emit a concentrated pressure wave toward the user. The concentrated pressure wave may vibrate a portion of the user's body (e.g., the user's hand).

In some embodiments, the haptic output device 118 may be a portion of the housing of the computing device 101. In other embodiments, the haptic output device 118 may be housed inside a flexible housing overlaying a surface associated with the computing device 101 (e.g., the front or back of the computing device 101). For example, the computing device 101 may comprise a watch. The haptic output device 118 may comprise a layer of smart gel overlaying the interior of the band of the watch. Upon actuating the haptic output device 118 (e.g., with an electric current or an electric field), the smart gel may expand. This may cause the user to perceive a haptic effect comprising a squeezing sensation around the user's wrist.

Turning to memory 104, modules 124, 125, 126, and 128 are depicted to show how a device can be configured in some embodiments to provide object manipulation with haptic effects. In this example, the object interaction detection module 124 comprises code that configures the processor 102 to monitor the interaction sensor 132 and/or the additional sensors 130 to determine if a user has interacted with an object. The object interaction detection module 124 may comprise one or more algorithms or lookup tables useable by the processor 102 to determine whether a user is interacting with an object.

For example, the computing device 101 may be positioned within a product in a store. A user may, for example, lift the product off a shelf. The object interaction detection module 124 may comprise code that samples the sensor 130 (e.g., an accelerometer) to track the acceleration of the product. If the amount of acceleration exceeds a threshold, the object interaction detection module 124 may determine that the product is being manipulated (e.g., that the user has lifted the product).

As another example, the interaction sensor 132 may comprise a range sensor oriented toward an object. The object interaction detection module 124 may comprise code that configures the processor 102 to receive data from the range sensor. The object interaction detection module 124 may further comprise code that analyzes the data to determine whether the user is within a certain distance of the object, which may be indicative of a user interaction.

As still another example, the interaction sensor 132 may comprise a 3D imaging system oriented toward an object. The object interaction detection module 124 may comprise code for analyzing images from a 3D imaging system to determine whether a user is interacting with an object. Further examples of methods for detecting user interactions with objects are described with respect to FIG. 9.

In some embodiments, the object may comprise a virtual object. The virtual object may be, for example, output on a touchscreen display comprising touch sensitive surface 116. The object interaction detection module 124 may comprise code that configures the processor 102 to detect a user interaction with the virtual object. For instance, a user may tap on a location on the touch sensitive surface 116 associated with the virtual object. The object interaction detection module 124 may receive one or more sensor signals associated with the user interaction from the touch sensor 108. In some embodiments, the sensor signals may incorporate the location, pressure, direction, and/or speed of the user interaction. The object interaction detection module 124 may determine one or more characteristics of the user interaction based on the sensor signal.

As another example, the virtual object may be part of an augmented reality environment output via, for instance, a touchscreen display, goggles, glasses, or contact lenses. The augmented reality environment may comprise camera data that has been supplemented ("augmented") with virtual content, such as text or images. For example, the interaction sensor 132 may comprise a camera. In some embodiments, the interaction sensor 132 may capture images of the user's dining room, which the processor 102 may use to generate the augmented reality environment. The processor 102 may further generate one or more virtual objects within the augmented reality environment. For example, in one embodiment, the processor 102 may include a virtual table in the augmented reality environment. A user may interact with the virtual object, for example, by touching or gesturing in an area in real space associated with the virtual object. In some embodiments, the object interaction detection module 124 may determine one or more characteristics of the user interaction, for example, by analyzing images from the interaction sensor 132.

In some embodiments, the object interaction detection module 124 comprises code that determines a characteristic (e.g., an amount of pressure, speed, direction, location, or a gesture) associated with the interaction. For example, the object interaction detection module 124 may comprise code that analyzes sensor signals from the sensor 130 and/or interaction sensor 132 to determine the characteristic. In one embodiment, for example, the object interaction detection module 124 may comprise code for analyzing images from a 3D imaging system to determine a type of gesture (e.g., swipe, two-finger pinch, shake, etc.) made by the user.

Object characteristic determination module 125 represents a program component that analyzes data regarding an object to determine a characteristic associated with the object. The object characteristic determination module 125 may comprise one or more algorithms or lookup tables useable by the processor 102 to determine a characteristic associated with an object.

In some embodiments, the object characteristic determination module 125 comprises code that analyzes data from the interaction sensor 132 and/or additional sensors 130 to determine the characteristic associated with the object. For example, object characteristic determination module 125 may comprise code that receives images of the object from a camera and applies Optical Character Recognition (OCR) to determine the contents of text associated with the object. As another example, the object characteristic determination module 125 may comprise code that analyzes images from the interaction sensor 132 to determine a height, width, color, size, shape, pattern, texture, name, QR code, barcode, label, logo, color scheme, shape, and/or another characteristic of the object.

In some embodiments, the object characteristic determination module 125 comprises code that analyzes data received via the network interface device 110 to determine a characteristic of the object. For example, the object may transmit a signal to the computing device 101 using Bluetooth, IEEE 802.11, RFID, or NFC. The signal may comprise a characteristic of the object (e.g., the signal may comprise a type, brand, barcode, price, RFID code, or electrical characteristic). The object characteristic determination module 125 may analyze parameters of the signal to determine the characteristic of the object.

In some embodiments, the object characteristic determination module 125 comprises code that determines a characteristic associated with the object using the Internet or another network (e.g., a LAN). For example, the object characteristic determination module 125 may comprise code for retrieving the name of a sports team (e.g., a baseball team) associated with an object (e.g., a baseball bat, helmet, or jersey) by communicating with one or more servers or webpages via the Internet. As another example, the object characteristic determination module 125 may comprise code for retrieving nutritional information associated with a food product in a store by communicating with a server associated with the store (e.g., the store's local server).

In some embodiments, the object characteristic determination module 125 comprises code that determines the characteristics of a virtual object. For example, the object characteristic determination module 125 may consult with locations in memory 104 to determine characteristics of the virtual object.

Haptic effect determination module 126 represents a program component that analyzes data to determine a haptic effect to generate. The haptic effect determination module 126 may comprise code that selects one or more haptic effects to output using one or more algorithms or lookup tables.

In some embodiments, haptic effect determination module 126 comprises code that determines a haptic effect to output based on a characteristic of the object. For example, the haptic effect determination module 126 may determine a haptic effect comprising a number of pulsed vibrations corresponding to the star rating of a product. As another example, the haptic effect determination module 126 may comprise code for determining a haptic effect associated with a brand or manufacturer of the object. For instance, Immersion Corporation may associate its brand with a haptic effect comprising four short pulsed vibrations. Upon the user interacting with an object produced by Immersion Corporation, the haptic effect determination module 126 may determine a haptic effect comprising four short pulsed vibrations. This may notify the user that the user is interacting with a product from Immersion Corporation.

In some embodiments, the haptic effect determination module 126 comprises code that retrieves a haptic effect and/or a characteristic of a haptic effect from a server over a network. For example, a user may interact with an object produced by Immersion Corporation. The haptic effect determination module 126 may query Immersion Corporation's servers (via a network such as the Internet) and receive haptic effect data (e.g., amplitude, waveform, and/or frequency and timing data). The haptic effect determination module 126 may determine a haptic effect based on the received haptic effect data.

In some embodiments, the haptic effect determination module 126 comprises code that determines a haptic effect based on whether a characteristic of the object meets one or more criteria. For example, the criteria may comprise a list of approved manufacturers for an electronics product. Upon the user interacting with an electronic device, the processor 102 may determine if the electronic device was produced by an approved manufacturer. If not, the haptic effect determination module 126 may determine a haptic effect comprising a buzzing sensation. As another example, the criteria may comprise dimensions (e.g., a length, width, and height for a piece of furniture). While the user is browsing a furniture store for living room furniture, the user may interact with a couch. The haptic effect determination module 126 may determine if the size of the couch is less than or equal to the dimensions. If so, the haptic effect determination module 126 may determine a haptic effect comprising a stroking sensation. This may notify the user that the couch will fit in the living room (or in the space designated for the couch).

Haptic effect generation module 128 represents programming that causes processor 102 to generate and transmit haptic signals to the haptic output device 118 to generate the selected haptic effect. For example, the haptic effect generation module 128 may access stored waveforms or commands to send to the haptic output device 118 to create the desired effect. In some embodiments, the haptic effect generation module 128 may comprise algorithms to determine the haptic signal. Further, in some embodiments, haptic effect generation module 128 may comprise algorithms to determine target coordinates for the haptic effect (e.g., coordinates for a location on the computing device 101 or object at which to output a haptic effect).

Although the modules 124, 125, 126, 128 are depicted in FIG. 1 as program components within the memory 104, in some embodiments, the modules 124, 125, 126, 128 may comprise hardware. For example, modules 124, 125, 126, 128 may comprise analog to digital converters, processors, microcontrollers, comparators, amplifiers, transistors, and other analog or digital circuitry.

Figure 2:
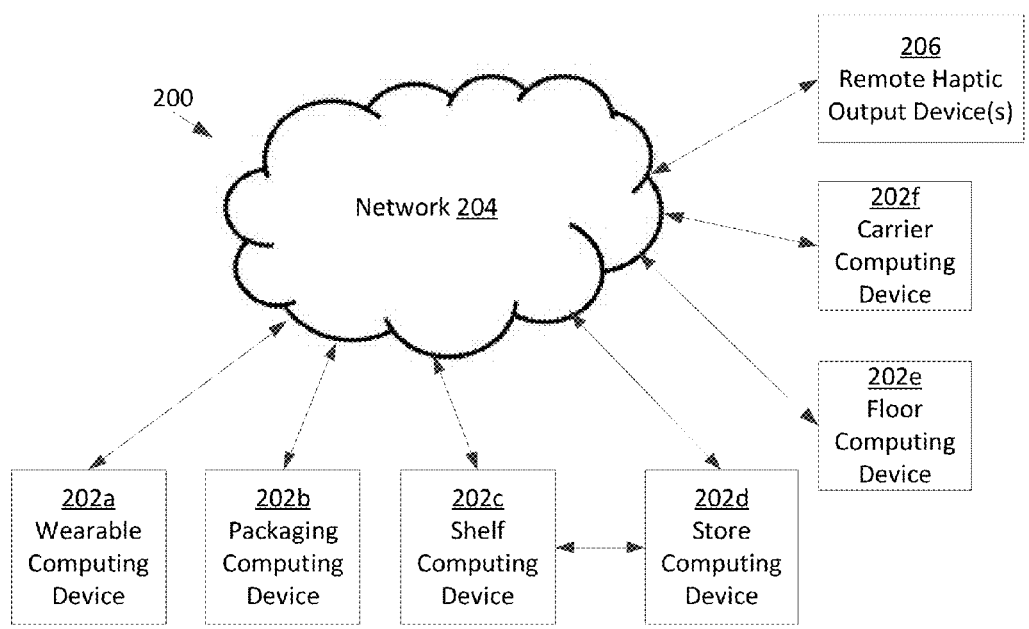
FIG. 2 is another block diagram showing a system for object manipulation with haptic feedback according to another embodiment.

FIG. 2 is another block diagram showing a system for object manipulation with haptic feedback according to another embodiment. The system 200 may comprise one or more remote haptic output devices 206. The system 200 may also comprise one or more computing devices 202*a-f*.

In the embodiment shown in FIG. 2, the system 200 comprises a wearable computing device 202*a*, a packaging computing device 202*b*, a shelf computing device 202*c*, a store computing device 202*d*, a floor computing device 202*e*, and a carrier computing device 202*f*. A wearable computing device 202*a* may comprise a computing device 202*a* associated with a wearable device (e.g., a ring) that is configured to be worn by the user. A packaging computing device 202*b* may comprise a computing device that is at least partially embedded within an object's packaging (e.g., an object's wrapper or container). A shelf computing device 202*c* may comprise a computing device that is at least partially embedded within or coupled to a shelf (e.g., for holding a product for sale in a store or a bookshelf). A store computing device 202*d* may comprise a computing device associated with a seller, manufacturer, and/or distributer of an object. A floor computing device 202*e* may comprise a computing device that is at least partially embedded within or coupled to a floor (e.g., within one or more floor tiles of a store). A carrier computing device 202*f* may comprise a computing device that is at least partially embedded within or coupled to a carrying device for holding an object (e.g., a shopping cart, basket, bag, or backpack). These computing devices 202*a-f* are described in greater detail below.

The computing devices 202*a-f* and remote haptic output device(s) 206 may be connected to a network 204. The network 204 may be any suitable number or type of networks or links, including, but not limited to, a dial-up network, a local area network (LAN), wide area network (WAN), public switched telephone network (PSTN), a cellular network, a WiFi network, the Internet, an intranet or any combination of hard-wired and/or wireless communication links. In some embodiments, the network 204 is a single network. In other embodiments, the network 204 may comprise two or more networks.

The computing devices 202*a-f* and remote haptic output device(s) 206 may directly communicate with each other and/or may communicate with each other via the network 204. For example, the shelf computing device 202*c* may communicate wirelessly with store computing device 202*d* (e.g., using Bluetooth). Further, the computing devices 202*a-f* and remote haptic output device(s) 206 may communicate with one or more remote servers (e.g., cloud servers, webservers, or other servers), databases, and/or computing devices via the network 204.

As described above, the system 200 may comprise a wearable computing device 202a. The wearable computing device 202a may be associated with a wearable device comprising, for example, a watch, wristband, hat, sleeve, jacket, collar, glasses, glove, ring, articles of clothing, headband, and/or jewelry. Upon a user interacting with an object, the wearable computing device 202a may output a haptic effect to a body part of the user (e.g., the user's wrist, arm, leg, foot, hand, finger, neck, head, or chest). For example, the wearable computing device 202a may comprise a ring. Upon the user contacting a product with a finger, the wearable computing device 202a may output a haptic effect configured to squeeze a finger of the user. This may alert the user to a characteristic of the product. For example, the product may comprise a food product and the haptic effect may be configured to alert the user to a negative characteristic, for example, that the food product contains a high amount of sodium.

As described above, the system 200 may comprise a packaging computing device 202b. For example, the packaging computing device 202b may be embedded within or coupled to the packaging of an object. The packaging computing device 202b may comprise a sensor (e.g., an accelerometer, pressure sensor, capacitive sensor, resistive sensor, 3D imaging system, or a LED-based tracking system) configured to detect a user interaction with an object. For example, the sensor may comprise a pressure sensor embedded within a portion of the object's packaging. The pressure sensor may be able to detect contact by a user. Based on signals from the sensor, the packaging computing device 202b may be configured to output a haptic effect (e.g., directly to the user's hand or finger as the user contacts the object).

As described above, the system 200 may comprise a shelf computing device 202c. The shelf computing device 202c may comprise a sensor (e.g., a pressure sensor, accelerometer, position sensor, 3D imaging system, or a LED-based tracking system) configured to detect a user interaction with an object. For example, the sensor may comprise a pressure sensor positioned under an object on the shelf. The sensor may be configured to detect a user lifting an object off the shelf. Based on signals from the sensor, the shelf computing device 202c may be configured to output a haptic effect.

As described above, the system 200 may comprise a store computing device 202d. The store computing device 202d may be associated with a seller, manufacturer, and/or distributer of an object. For example, the store computing device 202d may be owned or operated by the store in which the object is for sale. The store computing device 202d may comprise data (e.g., in a database) associated with the object. For example, the store computing device 202d may comprise a name, weight, size, price, discount, manufacturer, list of ingredients, and/or other characteristic associated with the object. One or more other computing devices 202a-c, 202e-f may communicate with the store computing device 202d to determine a characteristic associated with the object. For example, the wearable computing device 202a may transmit a query associated with the object to the store computing device 202d. The store computing device 202d may receive the query and consult a database to determine the quantity of the object available for sale in the store. The store computing device 202d may transmit a signal associated with the quantity to the wearable computing device 202a.

In some embodiments, the store computing device 202d may be configured to detect a user interaction with an object. For example, the store computing device 202d may be in wired or wireless communication with an interaction sensor. The interaction sensor may comprise, for example, a depth sensor oriented toward an object. Upon the user interacting with an object, the store computing device 202d may determine information associated with the object. Based on the information, the store computing device 202d may cause the remote haptic output device 206 and/or another computing device 202a-c, 202e-f to output a haptic effect. For example, the store computing device 202d may transmit a signal to a wearable computing device 202a configured to cause the wearable computing device 202a to output a haptic effect.

As described above, the system 200 may comprise a floor computing device 202e. The floor computing device 202e may output a haptic effect (e.g., a vibration) upon the user interacting with an object. For example, upon a user touching a product in a store, the floor computing device 202e may output a high-magnitude vibration. The user may perceive the haptic effect via the user's feet or another body part. The high-magnitude vibration may indicate to the user, for example, that the product is on sale. In other embodiments, the floor computing device 202e may comprise a computing device in communication with a remote haptic output device 206 that is embedded in or coupled to the floor. Upon the user interacting with an object, the floor computing device 202e may cause the remote haptic output device 206 to output a haptic effect (e.g., to the user's feet or another body part).

As described above, the system 200 may comprise a carrier computing device 202f. In some embodiments, the carrier computing device 202f outputs a haptic effect upon a user interacting with an object. For example, a user may be holding a shopping basket comprising a carrier computing device 202f. Upon a user grasping a bottle of alcohol, the carrier computing device 202f may determine whether the user is under 21 years old. If so, the carrier computing device 202f may output a strong vibration. The user may feel the strong vibration through a hand as the user holds the shopping basket. This may notify the user that it is illegal for the user to purchase the object. In other embodiments, the carrier computing device 202f comprises one or more sensors configured to detect if a user has placed an object in the carrying device. For example, the carrier computing device 202f may comprise or be embedded within a shopping cart. The carrier computing device 202f may detect if a user places an object within the shopping cart. In one such embodiment, upon the user placing a product into the shopping cart, the carrier computing device 202f may determine whether the total price of all the items in the shopping cart exceeds a threshold. If so, the carrier computing device 202f may output a strong vibration.

The system 200 may additionally or alternatively comprise one or more computing devices positioned in other locations or configurations. For example, the system 200 may comprise a computing device positioned within the object. As another example, the system 200 may comprise a computing device associated with a hand-held device or a graspable device (e.g., a mobile phone, e-reader, tablet, wand, stylus, or pen). In some embodiments, the computing device may be, for example, positioned in the user's pants pocket (or shirt pocket). Upon the user interacting with an object, the computing device may output a haptic effect to the user's thigh (or chest). In other embodiments, the user may interact with the object using an intermediary object, for example, as described below with respect to FIG. 5B.

In some embodiments, any of the computing devices 202a-f may cause any of the other computing device 202a-f (and/or the remote haptic output device 206) to output a haptic effect. For example, a user may be wearing glasses comprising a wearable computing device 202a. The wearable computing device 202a may detect the user grabbing a product off a shelf in a store. The wearable computing device 202a may transmit a signal to a packaging computing device 202b within the product's packaging. The signal may cause the packaging computing device 202b to output a haptic effect, e.g., to the user's hand. This may allow the wearable computing device 202a to cause a haptic effect to be output to a body part of the user (e.g., the user's hand) that the wearable computing device 202a may otherwise be unable to output haptic effects to (e.g., because the glasses may be positioned on the user's head).

As another example, the packaging computing device 202b may detect the user picking an object up off of a shelf in a store. The packaging computing device 202b may transmit a signal to the remote haptic output device 206. The signal may be configured to cause the remote haptic output device 206 to output a puff of air at the user's chest. This may allow the packaging computing device 202b to cause a haptic effect to be output to a body part of the user (e.g., the user's chest) to which the packaging computing device 202b may otherwise be unable to output haptic effects.

Figure 3:
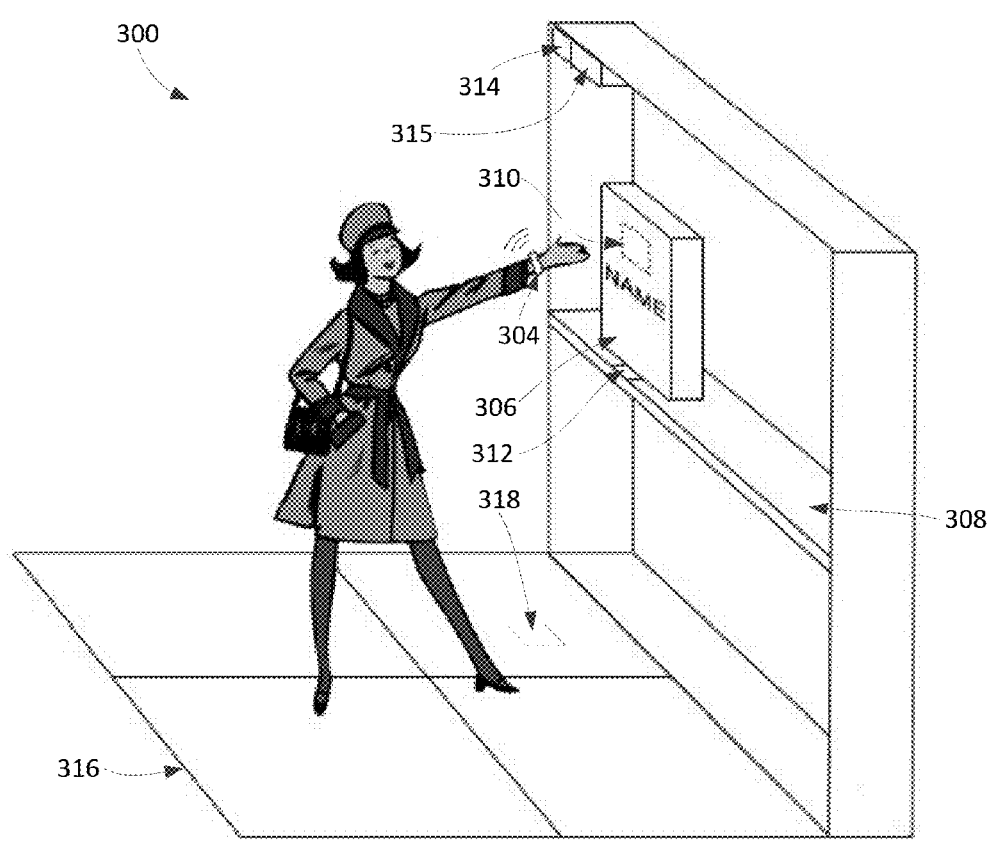
FIG. 3 shows an embodiment of a system for object manipulation with haptic feedback.

FIG. 3 shows an embodiment of a system for object manipulation with haptic feedback. The system 300 comprises an object 306 positioned on a shelf 308. The object 306 may comprise a toy, computer, mobile device, automotive component, movie, video game, video game console, appliance, television, medical device, mechanical or electrical component, remote control, food, etc. The system 300 may be associated with a store, warehouse, restaurant, medical center, garage, house, office, apartment, or other location.

In the embodiment shown in FIG. 3, an interaction sensor 315 (e.g., a 3D imaging system) is oriented toward the object 306. The interaction sensor 315 may detect a user interaction (e.g., tap, touch, gesture on, shake, lift, gesture toward, etc.) with the object 306. The user may interact with the object 306, for example, to receive information (e.g., the type, brand, manufacturer, size, color, nutritional value or information, function, content, weight, rating, price, expiration date, power consumption, noise level, etc.) associated with the object 306. The interaction sensor 315 may transmit a sensor signal to one or more computing devices 304, 310, 312, 318. Based on the user interaction, one or more of the computing devices 304, 310, 312, 318 may determine information (e.g., by querying a server over the Internet) associated with the object 306. The one or more computing devices 304, 310, 312, 318 may then output a haptic effect associated with the information.

In this example, the system 300 comprises a wearable computing device 304 that includes a wristband or watch. The system 300 also comprises a packaging computing device 310, a shelf computing device 312, a floor computing device 318, and a remote haptic output device 314. The remote haptic output device 314 may be in wired or in wireless communication with the computing devices 304, 310, 312, 318. In some embodiments, upon the user interacting with the object 306, one or more computing devices 304, 310, 312, 318 may determine information associated with the object 306. For example, the information may comprise whether the object 306 is on sale. One or more of the computing devices 304, 310, 312, 318 may cause the remote haptic output device 314 to output a remote haptic effect associated with the information. For example, the wearable computing device 304 may transmit a signal configured to cause the remote haptic output device 314 to output an ultrasonic pressure wave directed toward the user's hand. The user may perceive the ultrasonic pressure wave as a vibration on the user's hand. The haptic effect may indicate to the user that the object 306 is on sale. In some embodiments, the wearable computing device 304 may not cause the remote haptic output device 314 to output a haptic effect if the object 306 is not on sale. The lack of a haptic effect may indicate to the user that the object 306 is not on sale.

Figure 4:
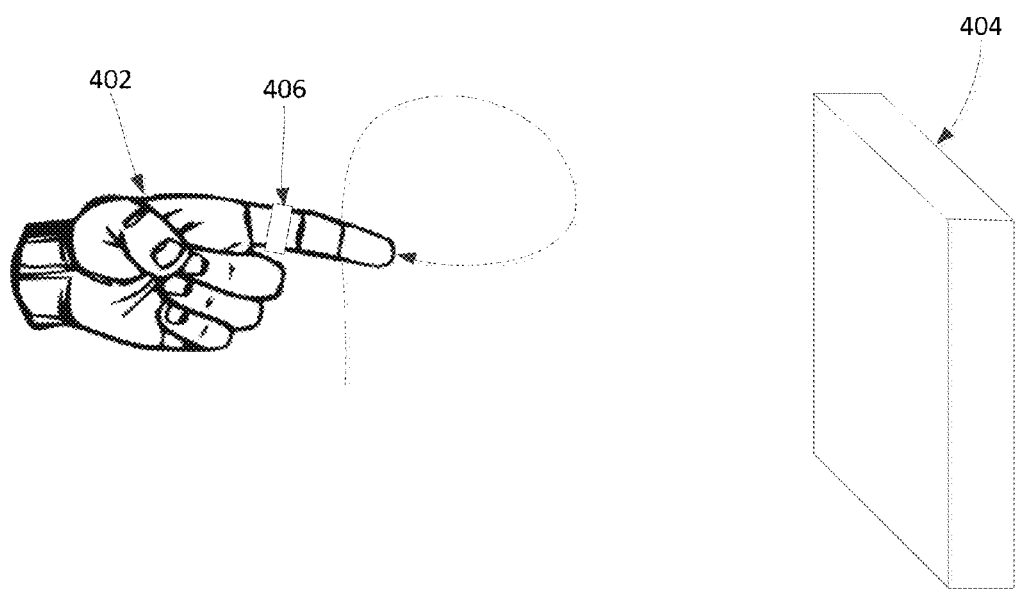
FIG. 4 shows another embodiment of a system for object manipulation with haptic feedback.

FIG. 4 shows another embodiment of a system for object manipulation with haptic feedback. In this example, the user 402 is wearing a computing device 406 comprising a ring. The user 402 is interacting with an object 404 by making a gesture in the air. In some embodiments, the gesture may be oriented toward the object 404 or within a predefined distance (e.g., 2 feet) from the object 404. For example, the user 402 may wave at, point at, reach for, and/or use a finger to draw a symbol in the air in front of the object 404. The computing device 406 may detect the user interaction and determine the user's gesture. Based on the characteristics of the gesture and/or the object 404, the computing device may determine information associated with the object 404. The computing device 406 may then output a haptic effect associated with the information.

For example, the user 402 may make a gesture in the air to determine information about the object 404, e.g., to determine power consumption information associated with the object 404. In the embodiment shown in FIG. 4, the user is drawing a "P" shape in the air in front of an object 404. The computing device 406 may detect a gesture and determine that the user is making a "P" shaped gesture. The computing device may further determine that the object 404 comprises a particular electronic device (e.g., a particular model of laptop computer). Based on the "P" gesture, the computing device may determine (e.g., via the Internet) the average amount of power consumed by the electronic device while in operation. In some embodiments, if the amount of power is below a threshold (e.g., input by the user or that is an industry standard), the computing device 406 may output a haptic effect (e.g., a short vibration). This may indicate to the user that the object 404 consumes an average amount of power that is acceptable to the user. In other embodiments, if the amount of power is above a threshold, the computing device 406 may output a haptic effect configured to indicate to the user 402 that the object 404 consumes an unacceptable amount of power.

Figure 5A:
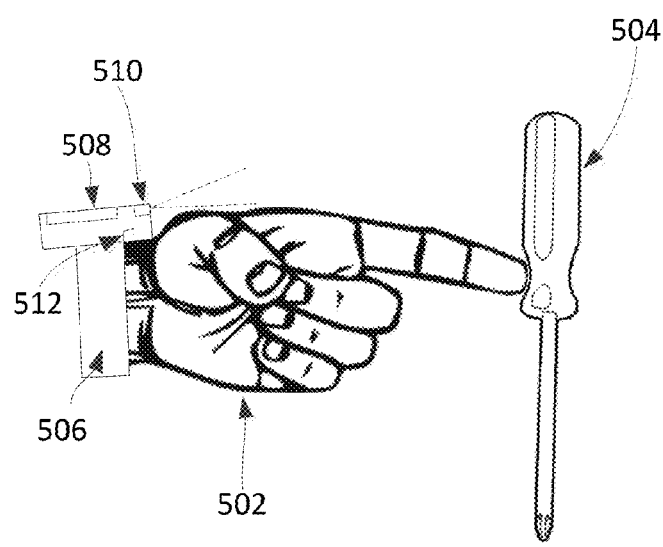
FIG. 5A shows still another embodiment of a system for object manipulation with haptic feedback.

FIG. 5A shows still another embodiment of a system for object manipulation with haptic feedback. In this example, the user 502 is wearing a watch comprising the computing device 506. The user 502 is interacting with an object 504 (e.g., a screw driver) by contacting (e.g., tapping or touching) the object 504. The computing device 506 may detect the contact via interaction sensor 510 (e.g., embedded within the computing device 506). The interaction sensor 510 may comprise, for example, a camera oriented toward the object 504. Based on the characteristics of the contact and/or the object 504, the computing device 506 may determine information associated with the object 404. The computing device 506 may then output a haptic effect associated with the information via a haptic output device 512.

Figure 5B:
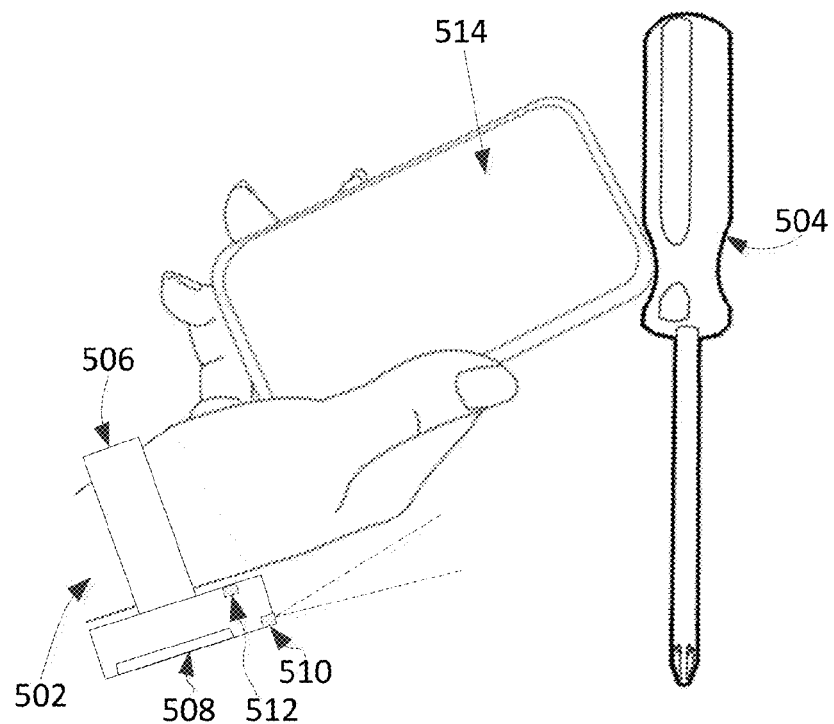
FIG. 5B shows yet another embodiment of a system for object manipulation with haptic feedback.

In some embodiments, the user may use an intermediary object (e.g., a stylus, pen, cane, or wand) for an interaction, and the computing device 506 may detect such an interaction. For example, as shown in FIG. 5B, the user 502 may contact the object 504 with an intermediary object 514 comprising a mobile phone. The computing device 506 may detect the contact and output an associated haptic effect. In some embodiments, the intermediary object 514 comprises the computing device 506 (e.g., rather than the computing device 506 being separate from the intermediary object 514). For example, rather than the user 502 wearing the computing device 506 on a wrist, the mobile phone may be the computing device.

In some embodiments, the user 502 may contact the object 504 to determine information about the object, e.g., if the object 504 is an acceptable price. The computing device 506 may detect the contact and determine the price of the object 504. In some embodiments, if the price is below a threshold (e.g., input by the user), the computing device 506 may output a haptic effect (e.g., a pulsed vibration). This may indicate to the user 502 that the object 504 has a price that is acceptable to the user 502. In other embodiments, the computing device 506 may perform a price comparison with other local stores. The computing device 506 may output a haptic effect (e.g., comprising two pulsed vibrations) configured to notify the user 502 that the price may be cheaper at another local store (e.g., a store within a 15 mile radius) or through an online retailer.

In some embodiments, the object 504 comprises a tool (e.g., a hammer, screwdriver, drill, nail, saw, screw, or bolt). A user 502 may be building (or repairing) a piece of furniture. The user 502 may be reading instructions for building the piece of furniture on the display 508 of the computing device 506 and, at a particular step, grab the tool. The computing device 506 may detect the contact (e.g., via the interaction sensor 510) and determine the type of the tool (e.g., a size 1 Phillips head screwdriver). The computing device 506 may determine whether the tool is correct for the project or for the particular step of the project. If not, the computing device 506 may output an intense vibration, e.g., to the wrist of the user 502 via the haptic output device 512. This may alert the user 502 that the user 502 has picked up the wrong tool.

As another example, in some embodiments, the object 504 comprises a medical tool. The user 502 may be performing a medical procedure (e.g., a surgery) and grab the medical tool. The computing device 506 may detect the contact and determine the type of the medical tool (e.g., a scalpel with a number 11 blade). The computing device 506 may determine if the medical tool is correct for the medical procedure or a particular the step of the medical procedure. If the medical tool is not correct for the project or the particular step of the project, the computing device 506 may output an intense vibration. This may alert the user 502 that the user 502 has picked up the wrong tool, which may prevent injury to the patient.

The computing device 506 may detect a contact anywhere on the object 504, or a contact with a specific location (e.g., the label) on the object 504. The computing device 506 may detect a location of the contact. For example, the computing device 506 may detect which portion of the object 504 (e.g., the top, bottom, left side, right side, front, back, a label, an image, a logo, a piece of text, etc.) was contacted by the user. In some embodiments, the computing device 506 may output a haptic effect upon the user 502 interacting with a specific portion of the object 504. For example, the user 502 may contact a manufacturer's logo on the object 504. The computing device 506 may detect the interaction with the manufacturer's logo and output a haptic effect associated with the manufacturer or brand of the object 504. In some embodiments, the computing device 506 may not output a haptic effect or may output a different haptic effect if the user 502 interacts with another portion of the object 504.

In some embodiments, the computing device 506 may detect multiple user interactions (or a single user interaction comprising multiple contacts) with the object 504. For example, in some embodiments, the object 504 may comprise a map. The user 502 may touch the map at a starting point on the map with a finger. The user 502 may sequentially or simultaneously (with another finger) touch the map at a destination location. The computing device 506 may detect the user interactions and execute a mapping application. The computing device 506 may further determine the distance between the start point and destination location. If the distance is below a threshold, the computing device 506 may output a haptic effect.

In some embodiments, the object 504 may comprise a virtual object. The virtual object may be, for example, output on the display 508. In one such embodiment, the virtual object comprises images representing food items in the user's fridge. For instance, the virtual object may comprise an image of a bottle of milk, carrots, a piece of meat, etc. The computing device 506 may be configured to detect a user interaction with the virtual object. For example, a user may double tap on the display (e.g., which may be a touchscreen display) on a location associated with the bottle of milk. Based on the user interaction, the computing device 506 may determine information associated with the virtual object. For example, based on the double tap, the computing device 506 may determine, for example, how many bottles of milk the user has in the user's refrigerator. The computing device 506 may output a haptic effect associated with the information. For example, the computing device 506 may output an amount of pulsed vibrations equal to the number of bottles of milk in the user's refrigerator.

In some embodiments, the computing device 506 outputs a sound (e.g., via a speaker) based on the user interaction. For example, the computing device 506 may detect a user interaction with an object 504 and determine the price of the object 504. If the price is below a threshold (e.g., input by the user), the computing device 506 may output the sound of a cash register opening (e.g., "ching ching"). This may notify the user that the object 504 has an acceptable price. As another example, the computing device 506 may output a beep if the object 504 (e.g., a Blu-Ray DVD) is compatible with another object (e.g., a DVD player) owned by the user 502. This may provide additional information about the object 504 to the user 502.

In some embodiments, the computing device 506 outputs data on a display 508 based on the user interaction. For example, a user may tap on an object 504 in a store. The computing device 506 may determine the price of the object 504 in the store and the average price of the object 504 (e.g., as determined based on prices from a plurality of stores). If the price in the store is lower than the average price of the object 504, the computing device 506 may output a single dollar sign on the display 508. If the price is higher than the average price of the object 504, the computing device 506 may output three dollar signs on the display 508. As another example, the computing device 506 may determine the quantity of the object 504 the store has left in stock (e.g., by querying a server associated with the store). The computing device 506 may output the quantity on a display 508. This may provide additional information about the object 504 to the user 502.

In some embodiments, the computing device 506 outputs a haptic effect, sound, and/or data on a display 508 substantially simultaneously with the user interaction. For example, the computing device 506 may perform a number of operations (e.g., determine that a user interaction with the object 504 occurred, determine a characteristic of the object 504, and determine a haptic effect) and output a haptic effect quickly enough that the user perceives the haptic effect as being substantially simultaneous with the user interaction.

Figure 6:
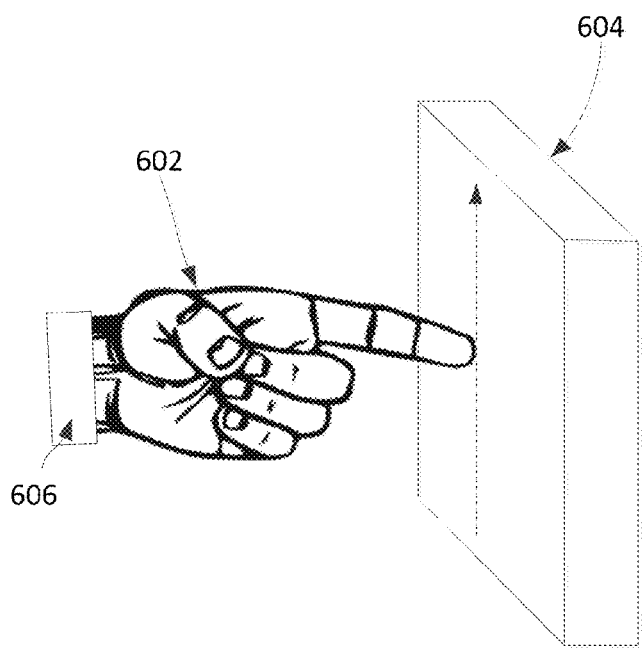
FIG. 6 shows another embodiment of a system for object manipulation with haptic feedback.

FIG. 6 shows another embodiment of a system for object manipulation with haptic feedback. In this example, the user 602 is wearing a computing device 606 comprising a wrist band. The user may gesture on a surface of the object 604 to interact with the object. For example, the user may perform a two finger pinch on, move multiple fingers along, or make a checkmark on a surface of the object 604.

In some embodiments, the computing device 406 detects a gesture and, based on the gesture, determines a particular characteristic of the object 404. For example, in the embodiment shown in FIG. 6, the user 602 is interacting with the object 604 by moving a finger longitudinally upward along a front surface of the object 604. This user may be making this gesture to, for example, determine if the height of the object 604 is less than a predefined height. Based on this specific gesture, the computing device 606 may communicate with a local server over a network to determine the dimensions of the object 604. In some embodiments, if the height of the object 604 is below a threshold, the computing device 606 may output a haptic effect (e.g., a low frequency vibration). This may indicate to the user that the object 604 is an acceptable height, e.g., can fit into a space in the user's home (such as a cupboard). In other embodiments, if the height of the object 604 is above the threshold, the computing device 606 may output another haptic effect, e.g., configured to indicate to the user 602 that the object 604 is not an acceptable height.

Figure 7:
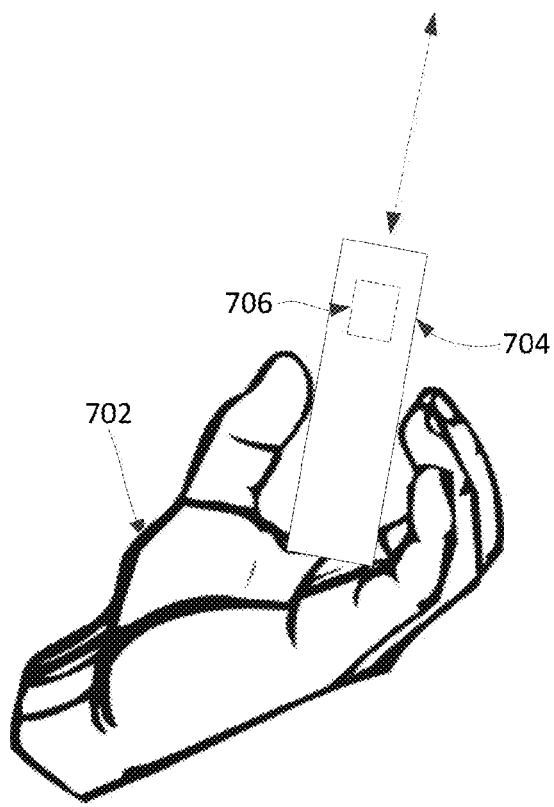
FIG. 7 shows still another embodiment of a system for object manipulation with haptic feedback.

FIG. 7 shows still another embodiment of a system for object manipulation with haptic feedback. In some embodiments, the user 702 may interact with an object 704 by making a gesture using the object 704. For example, the user 702 may move the object 704 in real space (e.g., using the object to draw a letter or number in the air, rotating the object, tilting the object, etc.).

In the embodiment shown in FIG. 7, the user 702 is shaking the object 704 up and down. The user 702 may shake the object 704 to determine, e.g., whether the object 704 is non-refundable under a return policy. The computing device 706 (e.g., positioned in the object 704) may detect the shake and determine a return policy associated with the object 704 (e.g., by communicating with a store computing device or via the Internet). In some embodiments, the computing device 706 may output a haptic effect associated with the return policy. For example, if the object 704 is non-refundable, the computing device 706 may output a haptic effect comprising three pulsed vibrations. If the object 704 is refundable, the computing device 706 may output a haptic effect comprising stroking sensation.

In some embodiments, the user interaction may comprise moving the object 704 close to a portion of the user's body (e.g., foot, arm, leg, shoulder, hand, neck, head, back, chest, stomach, thigh, etc.) or contacting a portion of the user's body with the object 704. For example, the user 702 may want to purchase a bottle of soda. The user 702 may pick up a bottle of soda and tap his right thigh (e.g., over his wallet in his right pocket) with the bottle of soda. The computing device 706 may detect the tap and determine the quantity of the object 704 that the user 702 already has in a refrigerator at home. In some embodiments, the user 702 may have input the quantity into the computing device 706. For example, the computing device 706 may execute a shopping list application. The user may have input the quantity into the shopping list application. The computing device 706 may determine the quantity from the shopping list application. In other embodiments, the user 702 may have a smart refrigerator or other device capable of determining the contents of the refrigerator and transmitting the quantity to the computing device 706. If the user 702 has a quantity of the product below a threshold (e.g., the user 702 has less than three bottles of soda), the computing device 706 may not output a haptic effect. If the user 702 has a quantity of the product above a threshold, the computing device 706 may output a buzzing sensation. This may help the user 702 make smarter purchasing decisions.

In some embodiments, the computing device 706 may detect a plurality of user interactions with an object 704 (e.g., making a gesture in front of the object 704, contacting the object 704, making a gesturing along a surface of the object 704, and making a gesture using the object 704). The computing device 706 may determine one or more characteristics associated with the object 704 for each detected user interaction. The computing device 706 may further output one or more haptic effects associated with one or more of the characteristics. For example, the computing device 706 may detect user pointing with a finger toward the object 704 and output a haptic effect associated with the price of the object 704. The computing device 706 may also detect the user tapping on the object 704 and output a haptic effect associated with the make or model of the object 704. The computing device 706 may further detect the user lifting and rotating the object 704 by 90 degrees and output a haptic effect associated with the star rating of the object 704.

In some embodiments, a user interaction may comprise causing an interaction between multiple objects. For example, the user 702 may tap the object 704 against another object. For instance, the user 702 may tap a mobile phone against a mobile phone docking station. In some embodiments, the computing device 706 may detect the interaction between the objects and determine information associated with one or more of the objects. For example, the computing device 706 may detect the interaction between the mobile phone and the docking station and determine if the docking station is compatible with the mobile phone. In some embodiments, the computing device 706 may output a haptic effect (e.g., a vibration) associated with the information, e.g., to notify the user that the two objects are compatible or are not compatible.

As another example, the computing device 706 may detect a user 702 interacting with (e.g., tapping, holding, gesturing on, or gesturing toward) a first object 704 with a first body part and interacting with a second object 704 with a second body part. For instance, the computing device 706 may detect the user 702 interacting with the first object 704 with the user's right hand and interacting with the second object 704 with the user's left hand. The computing device 706 may determine, for example, which object 704 is heavier. In some embodiments, if the first object 704 is heavier, the computing device 706 may output a haptic effect (e.g., a vibration) to the user's first body part (e.g., the user's right hand). If the second object 704 is heavier, the computing device 706 may output a haptic effect to the user's second body part (e.g., the user's left hand). In some embodiments, if the objects 704 are the same weight (or have weights that are within a predefined tolerance, such as 0.5 lbs, from one another), the computing device 706 may output a haptic effect comprising a pulsed vibration to a plurality of body parts (e.g., both of the user's hands).

Figure 8:
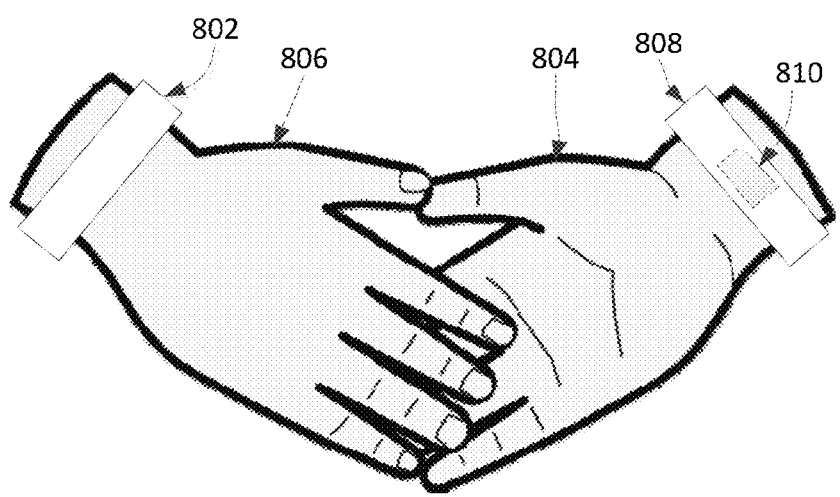
FIG. 8 shows yet another embodiment of a system for object manipulation with haptic feedback.

FIG. 8 shows yet another embodiment of a system for object manipulation with haptic feedback. In this example, the object comprises another person 804. The user 806 may interact with the person 804 by, for example, shaking hands with the person 804. A computing device 802 associated with the user 806 may detect the interaction and determine a characteristic associated with the person 804. The computing device 802 may determine the characteristic, for example, by analyzing images of the person 804 from a camera, performing an Internet search (e.g., using the person's 804 name), searching a social media website, and/or searching a database (e.g., a public records database). Other examples of methods for determining the characteristic are further described below. In some embodiments, the characteristic may comprise, for example, a name, social security number, net worth, height, age, heritage, hair color, nationality, eye color, medical condition, credit score, gender, credit card number, username (e.g., for a website or account), password, temperament, mood, employer, job, hobby, likes, and/or dislikes. The computing device 808 may output a haptic effect associated with the characteristic.

In some embodiments, the computing device 802 determines the characteristic based on data received (e.g., wirelessly) from another computing device 808 and/or electronic device (e.g., RFID tag). The other computing device 808 and/or electronic device can be associated with the other person 804. For example, the person 804 may be wearing a computing device 808 comprising a biosensor 810. The biosensor 810 may measure a heart rate, temperature, blood pressure, biorhythm, and/or other biological characteristic of the person 804. The computing device 808 may transmit this information to the computing device 802 associated with the user 806. In some embodiments, the computing device 802 may use the information as the characteristic. In other embodiments, the computing device 802 uses the information to determine a characteristic about the person 804. For example, the computing device 802 may use the information to determine the mood, temperament, or emotional state of the person 804. In one such embodiment, the computing device 802 may determine that the person 804 is angry based on, e.g., the information comprising a high blood pressure. In such an embodiment, the computing device 808 may output a haptic effect configured to, for example, warn the user 806 of danger or that the person 804 is angry.

As another example, the computing device 808 may transmit a username associated with a dating site to the computing device 802. The computing device 802 may consult the dating website to determine if the person 804 has traits that match one or more traits desired by the user 806. If so, the computing device 802 may output a stroking sensation. This may notify the user 806 that the person 804 is a potential romantic match. If the person 804 has a trait that is undesirable to the user 806, the computing device 802 may output a stinging sensation. This may notify the user 806 that the person 804 may not be a good romantic match.

As still another example, the person 804 may be a salesmen that is selling a product. The computing device 808 may transmit data associated with the product to the computing device 802. The computing device 802 may determine if the user 806 would be interested in purchasing the product (e.g., by analyzing the purchasing habits of the user 806 or using data input by the user 806). If so, the computing device 802 may output a high frequency vibration.

In other embodiments, the computing device 802 may analyze one or more images and/or physical features associated with the person 804 to determine the characteristic. For example, the computing device 802 may capture an image of the person 804 using a camera. The computing device 802 may use the image to perform facial recognition, read a name tag associated with the person 804, and/or otherwise identify the person 804. The computing device 802 may then communicate with a server (e.g., for a social network, dating website, search engine, or personal website) to determine additional characteristics about the person 804.

In some embodiments, the object comprises an animal (e.g., cat, dog, turtle, hamster, ferret, or bird). Upon a user 806 interacting with the animal, the computing device 802 may determine one or more characteristics of the animal (e.g., breed, allergen information, temperament, or mood). The computing device 802 may output a haptic effect, for example, configured to warn the user 806 that the user 806 may be allergic to the animal.

Illustrative Methods for Object Manipulation with Haptic Feedback

Figure 9:
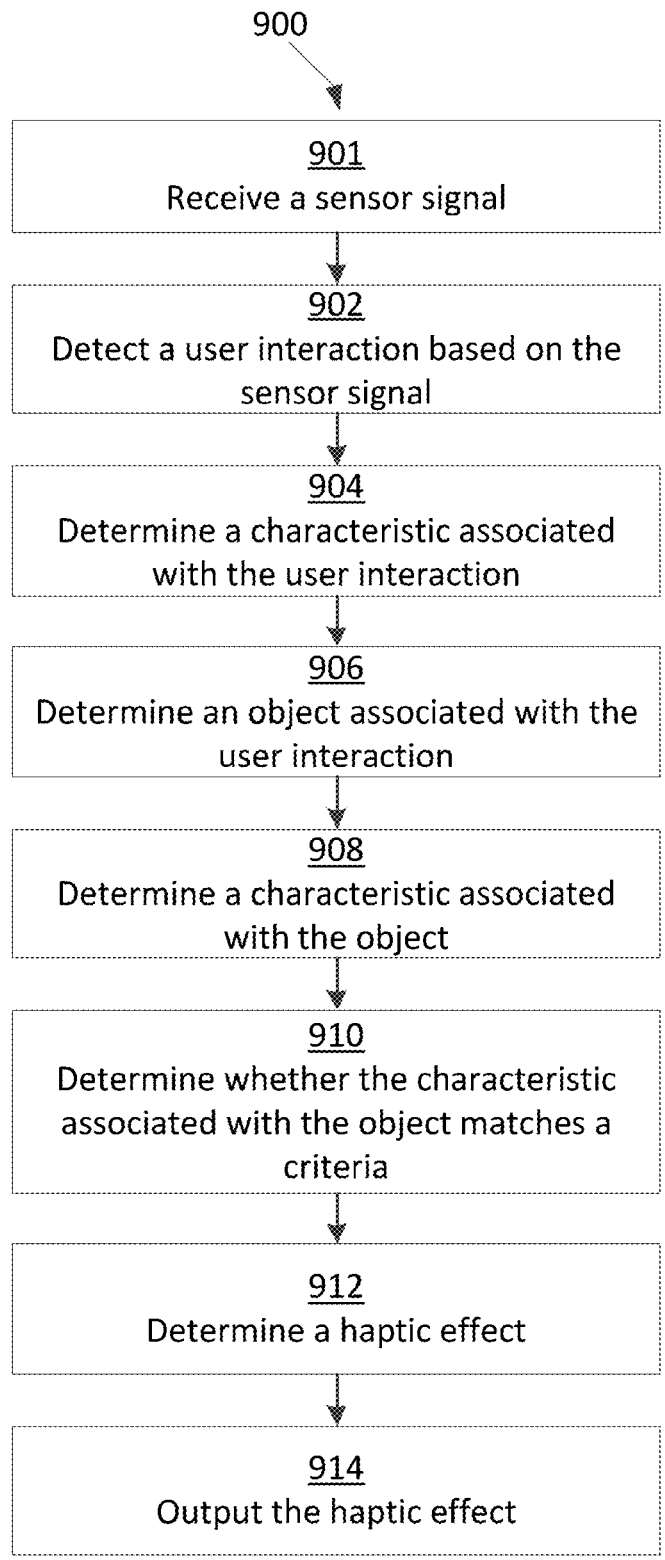
FIG. 9 is a flow chart of steps for performing a method for providing object manipulation with haptic feedback according to another embodiment.

FIG. 9 is a flow chart of steps for performing a method for providing object manipulation with haptic feedback according to one embodiment. In some embodiments, the steps in FIG. 9 may be implemented in program code that is executed by a processor, for example, the processor in a general purpose computer, a mobile device, or a server. In some embodiments, these steps may be implemented by a group of processors. In some embodiments one or more steps shown in FIG. 9 may be omitted or performed in a different order. Similarly, in some embodiments, additional steps not shown in FIG. 9 may also be performed. The steps below are described with reference to components described above with regard to computing device 101 shown in FIG. 1.

The method 900 begins at step 901 when the processor 102 receives a sensor signal. The processor 102 may receive the sensor signal from the interaction sensor 132 and/or the additional sensors 130. The sensor signal may comprise data that is associated with a user interaction with an object. For example, in one embodiment, the data may comprise one or more images of a store shelf on which an object is sitting. In such an embodiment, the image may comprise features such as the object, the shelf, other nearby objects, and a body part of the user (e.g., a user's finger). The user's body part may be contacting or near the object.

The method 900 continues at step 902 when the processor 102 detects a user interaction based on the sensor signal. For example, the computing device 101 may be positioned within the object and the interaction sensor 132 may comprise an accelerometer. Upon the user shaking the object, the processor 102 may detect the shake via sensor signals from the accelerometer. As another example, the interaction sensor 132 may comprise a 3D imaging system oriented toward the object. Upon the user gesturing in front of the object, or along the surface of the object, the processor 102 may analyze images from the 3D imaging system. Upon analyzing the images, the processor 102 may determine that the pixels correlating to the user's hand are oriented in a particular manner associated with the user contacting or gesturing near the object.

In some embodiments, the user interaction comprises removing the object from a shelf, table, or other location on which the object is positioned. For example, the computing device 101 may be embedded in a shelf on which the object sits. An interaction sensor 132 comprising a switch or a pressure sensor may be positioned on the shelf and below the object. If the user removes the object from the shelf, the interaction sensor 132 may detect a drop in pressure or a change in the state of the switch and transmit a sensor signal to the processor 102. Based on the sensor signal, the processor 102 may determine that the user lifted the object from the shelf. In some embodiments, if the low pressure persists or the switch remains in a particular state for a predetermined period of time (e.g., 2 seconds), the processor 102 may determine that the user is holding the object.

In some embodiments, the user interaction comprises positioning the computing device 101 within a predefined distance from the object. For example, the object may transmit a wireless signal (e.g., an IEEE 802.11, Bluetooth, a NFC signal, or RFID signal) to the processor 102 (via the network interface device 110). Based on the presence or the strength of the wireless signal (e.g., if the strength exceeds a threshold), the processor 102 may determine whether the object is within the predefined distance (e.g., 3 inches) from the computing device 101. If so, the processor 102 may determine that a user interaction has occurred.

As another example, the processor 102 may receive a first set of GPS data from the interaction sensor 132. The object may also comprise GPS functionality and transmit a second set of GPS data to the computing device 101. The processor 102 may compare the first set of GPS data to the second set of GPS data and determine the relative distance between the computing device 101 and the object. If the computing device 101 is within a predetermined distance from the object, the processor 102 may determine that a user interaction has occurred.

The method 900 continues at step 904 when the processor 102 determines a characteristic associated with the user interaction. In some embodiments, the processor 102 may analyze signals from the sensor 130 and/or the interaction sensor 132 to determine a direction, orientation, pattern, pressure amount, speed, and/or other characteristic of the user interaction.

For example, in some embodiments, the computing device 101 is positioned within the object and the interaction sensor 132 may comprise a gyroscope. The processor 102 may determine that the user rotated the object (and by how much) based on orientation sensor signals from the gyroscope. As another example, in some embodiments, the interaction sensor 132 comprises a 3D imaging system oriented toward the object. The processor 102 may analyze a plurality of images from the 3D imaging system to determine the characteristics of a gesture. For instance, the processor 102 may analyze a plurality of images and determine that the user made an "X" shape in the air with a finger. As still another example, in some embodiments, the computing device 101 is positioned within the object and the sensor 130 may comprise an accelerometer. The processor 102 may receive one or more sensor signals from the accelerometer and determine, for example, that the user is shaking the object.

The method 900 continues at step 906 when the processor 102 determines an object associated with the user interaction. In some embodiments, the object may comprise a product in a store (e.g., a box of cereal), a tool (e.g., a hammer or screw driver), a medical device (e.g., a trocar, needle, or heartbeat monitor), an automobile, a human, an animal, etc.

In some embodiments, the processor 102 may associate a user interaction with a particular object based on the proximity of the computing device 101 to the object. Examples include using GPS data and the strength of a wireless signal (e.g., as described in step 902 above) to determine whether the computing device 101 is within a predefined distance to the object. If so, the processor 102 may associate the object with the user interaction.

In some embodiments, the processor 102 associates a user interaction with a particular object based on the proximity of the user interaction to the object. For example, a user may gesture with a finger in front of an object. The interaction sensor 132 may detect the gesture and transmit a sensor signal to the processor 102. The processor 102 may analyze the sensor signal to determine the distance between the finger and the object. If the finger is within a particular distance (e.g., 6 inches) from the object, the processor 102 may associate the gesture with the object.

In some embodiments, the processor 102 associates a user interaction with a particular object based on a direction or orientation of the user interaction. For example, a user may point at an object the user is interested in purchasing. The interaction sensor 132 may detect the gesture and transmit a sensor signal to the processor 102. The processor 102 may analyze the sensor signal and determine that the point gesture is directed toward the object. Based on the direction of the gesture, the processor 102 may associate the object with the point interaction.

In some embodiments, the processor 102 associates a user interaction with a particular object by comparing sensor data from the object to sensor data from the computing device 101. For example, a user may wear a wristband comprising the computing device 101. The user may pick up and shake an object. The processor 102 may receive a first set of accelerometer data associated with the shake from an interaction sensor 132 within the wristband. The processor 102 may also receive a second set of accelerometer data from an accelerometer within the object (e.g., the object may wirelessly communicate the accelerometer data to the computing device 101). The processor 102 may compare the two sets of accelerometer data. For example, the processor 102 may compare the time stamps of peaks in the two sets of accelerometer data. If the time difference between the two time stamps is below a threshold (e.g., 0.5 s), the processor 102 may determine that the shake was with respect to that particular object.

As another example, a user may pick up an object off a shelf. The shelf may comprise a computing device 101 configured detect the object's removal and transmit (e.g., wirelessly) a time stamp associated with when the object was removed from the shelf. The processor 102 may receive the time stamp and compare the time stamp with a time stamp associated with data (e.g., an image) from interaction sensor 132. If the time difference between the two time stamps is below a threshold, the processor 102 may determine that the user picked up that particular object.

The method 900 continues at step 908 when the processor 102 determines a characteristic associated with the object. In some embodiments, the processor 102 may rely on programming in the object characteristic determination module 125 to determine the characteristic. The characteristic may comprise information about the object. For example, depending on the type of object, the characteristic may comprise a nutritional fact (if the object is a food product), size, weight, depth, color, texture, shape, dimension, price, discount, product rating (e.g., a grade or another comparative metric, such as a "star rating"), expiration date, function or utility (e.g., what function the object performs or may be used for), available quantity or whether the object is in stock, restriction on use, warranty, brand, manufacturer, producer, place of production, amount of power consumption or other electrical characteristic, an amount of noise, a mechanical characteristic, top speed, average speed, material (e.g., whether the object is made of wood, glass, ceramic, plastic, and/or metal), and/or compatibility information (e.g., devices with which the object is compatible) associated with the object.

In some embodiments, the processor 102 determines a characteristic associated with the object based on the characteristic associated with the user interaction. For example, the processor 102 may determine different characteristics associated with an object in response to different user interactions. For example, the processor 102 may determine the number of calories in a food product upon the user tapping the food product. The processor 102 may determine the amount of sugar in the food product upon the user moving a finger along the surface of the food product in an "S" shape.

In some embodiments, processor 102 determines a characteristic associated with the object based on a wired or wireless signal (e.g., from another computing device 101). For example, the object may comprise a computing device 101 or the shelf may comprise a computing device 101. The object or the shelf may transmit information about the object which can be received by the processor 102. The information may include, for example, an identifier (e.g., a name, QR code, bar code, QR code, RFID code, or unique identifier), classification (e.g., the type of product, manufacturer, producer, or brand), price, discount, coupon, or function (e.g., what the product does or may be used for) associated with the object. For example, if the object is a shampoo bottle, the information may comprise exactly which bottle of shampoo it is (e.g., number 3 on the shelf), what kind of product it is (e.g., shampoo), what specific product it is (e.g., Hair Company's shampoo for fine hair, or a barcode), or what brand of product it is (e.g., Hair Company brand).

In some embodiments, the processor 102 determines the characteristic using the Internet or a LAN. The processor 102 may communicate with one or more servers, databases, and/or webpages via the Internet or a LAN to determine the characteristic. For example, the processor 102 may query multiple databases over the Internet (e.g., using the object's bar code) to determine the number of stores proximate to the user (e.g., within 10 miles) that sell the object. The processor 102 may also determine which store has the cheapest price.

The method 900 continues at step 910 when the processor 102 determines whether the characteristic matches a criterion. The criterion may comprise, for example, a nutritional characteristic (e.g., a sodium level, calorie level, nutritional value, whether the object includes a certain food or chemical), an expiration date, a production or manufacturing characteristic (e.g., if the object was produced locally or was produced in a specific country), a return policy (e.g., if sale of the object is a final, non-refundable sale), an amount of power consumption, an amount of noise (e.g., generated by the object), compatibility information (e.g., whether the object is compatible with another device), a dimension, a shape, a size, an amount of the object the user already owns, and/or any other criterion associated with the object.

In some embodiments, the user inputs the criterion into the computing device 101 (e.g., via a touch screen display, a button, a switch, a mouse, a keyboard, or another device in communication with the computing device 101). For example, the user may select among a plurality of available criteria, or input criteria, using a mobile application. The mobile application can be executing on a mobile device in communication with (or comprising) the computing device 101. The mobile device may transmit the criteria to the computing device 101, which can store the criteria in memory 104.

In some embodiments, the criterion comprises an item on a list. For example, the user may download a wedding registry list onto the computing device 101. As the user browses through stores, the user may interact with an appliance. Based on the interaction, the processor 102 may determine the name and/or manufacturer of the appliance. If the name and/or manufacturer of the appliance correspond to an item on the wedding registry list, the processor 102 may determine a match.

In some embodiments, the criterion comprises compatibility information. For example, the user may input the name of a game console (e.g., owned by the user) into the computing device 101. As the user browses a store, the user may interact with a video game. Based on the interaction, the processor 102 may determine the name, bar code, and/or QR code of the video game. The processor 102 may determine (e.g., via the Internet or a store computing device) if the video game is compatible with the game console. If the video game is not compatible with the game console, the processor 102 may determine that there is no match. If the video game is compatible with the game console, the processor 102 may determine that there is a match.

In some embodiments, a third party (e.g., a doctor, nutritionist, friend, and/or family member) inputs the criterion. For example, the user may be on a diet. A nutritionist may input dietary information into the computing device 101. The user may interact with one or more food items as the user browses a grocery store. The processor 102 may detect the interaction and determine if the food item conforms to the diet. If the food item does not conform to the diet, the processor 102 may determine that there is not a match. If the food item does conform to the diet, the processor 102 may determine that there is a match.

In some embodiments, an application (e.g., executing on the computing device 101) generates the criterion. For example, the processor 102 may execute a financial budgeting application. The financial budgeting application may generate a monthly spending limit, e.g., to help the user budget money. Upon the user interacting with an object (e.g., placing the object in a shopping cart), the processor 102 may determine if the price of the object exceeds the monthly spending limit. If so, the processor 102 may determine that there is not a match. If the price of the product does not exceed the monthly spending limit, the processor 102 may determine there is a match.

As another example, the processor 102 may execute an analysis application. The application may analyze characteristics of the user. For example, the application may comprise a shopping analysis application that analyzes the shopping history of the user and/or purchasing decisions made by the user. Based on the analysis, the application may develop criteria against which characteristics of an object can be compared. For example, upon the user interacting with a tie, the processor 102 may determine whether the tie matches (e.g., in color, style, and/or material) one or more shirts recently purchased by the user. If so, the processor 102 may determine that there is a match. This may allow a user to quickly sift through a large quantity of ties (or other clothing or products) to find matches with previously purchased products. In some embodiments, the processor 102 determines if the user already owns the object. If so, the processor 102 may determine a match. If not, the processor 102 may determine that there is not a match.

In some embodiments, the processor 102 determines a match if a characteristic of an object is within a predetermined tolerance of a criterion. For example, the processor 102 may determine a match if the price of an object is within 5% of a predetermined price (e.g., $100). As another example, the processor 102 may determine a match if the color of an object is within two shades of a dark green color. As still another example, the processor 102 may determine a match if the size of a shoe is within half a shoe size of a men's shoe size 10.

In some embodiments, the processor 102 only determines a match if the processor 102 has not previously determined a match associated with the object. For example, a user may touch a car. The car may be on the user's wish list on the computing device 101, and thus the processor 102 may determine a match. Thereafter, if the user touches the car again, the processor 102 may determine that a match has already occurred and not determine a match again.

In some embodiments, the processor 102 only determines a match if the processor 102 has not previously determined a match associated with the object within a time period. For example, using the car example above, if the user touches the car again the same day, the processor 102 may determine that a match has already occurred. Thus, the processor 102 may not determine a match again. However, if the user touches the car the next day, the processor 102 may determine a match.

In some embodiments, the processor 102 only determines a match if the processor 102 has not previously determined a match associated with a particular characteristic of the object. For example, a user may touch a snowboard that costs $250. Because the user may have input criteria comprising the price of the snowboard being below $300, the processor 102 may determine a match. If the user interacts with the snowboard again, the processor 102 may determine that a match with the price criteria has already occurred and not determine a match again. Thereafter, the user may input additional criteria comprising the core type of the snowboard (e.g., birch). Because this is a different criterion, if the user interacts with the same snowboard, and the snowboard has a birch core, the processor 102 may determine a match with the birch core criteria.

In some embodiments, the processor 102 only determines a match with a specific criterion if the processor 102 has not previously determined a match with the specific criterion within a time period. For example, using snowboard example above, if the user touches the snowboard again the same day, the processor 102 may determine that a match has already occurred with the price and core criteria. Thus the processor 102 may not determine another match. However, if the user touches the snowboard the next day, the processor 102 may determine a match with one or both criteria.

In some embodiments, the processor 102 determines a match if the target market for the product matches a characteristic of the user (e.g., the criterion may be a characteristic of the user). For example, the user may input (or the computing device 101 may otherwise determine using social media, the Internet, and/or other resources) an age, height, gender, hair color, mood, and/or other physical or emotional characteristic. If a product is designed for a user with that characteristic (e.g., if the product is designed for men and the user is a male), the processor 102 may determine a match.

The method 900 continues at step 912 when the processor 102 determines a haptic effect. In some embodiments, the processor 102 determines a haptic effect if there is a match and/or a haptic effect if there is not a match. For example, the processor 102 may determine a haptic effect comprising a vibration if there is a match. The processor 102 may determine no haptic effect if there is not a match.

In some embodiments, the processor 102 determines a haptic effect based on a characteristic associated with the object. For example, the processor 102 may determine the haptic effect based on the brand, height, width, shape, function, color, material, manufacturer, location, price, quality, and/or expiration date of the object. For instance, as described above, the processor 102 may determine a haptic effect associated with the object's brand.

In some embodiments, the processor 102 determines a haptic effect that is configured notify a user of a positive or a negative characteristic of an object. For example, if the object is a food product containing a pesticide or chemical, the processor 102 may determine a haptic effect comprising a stinging sensation. This may alert the user that the food product contains harmful ingredients. As another example, if the object is a food product containing organic ingredients, the processor 102 may determine a haptic effect comprising a stroking sensation. By perceiving either a stinging sensation or a stroking sensation, the user may be notified of the contents of the food product and guided toward purchasing or not purchasing the product.

In some embodiments, the processor 102 determines a haptic effect with a magnitude that may be indicative of how "good" or "bad" a purchase may be. A purchase may be "good," for example, if the object contains healthy ingredients, has a low price, aligns with a user's spending or purchasing habits, is targeted toward people with the user's characteristics, etc. A purchase may be "bad" if the object contains unhealthy or harmful ingredients, has a high price, does not align with the user's spending or purchasing habits, is targeted toward people with characteristics different from those of the user, etc. For example, the processor 102 may determine a haptic effect comprising a low-magnitude vibration if the user interacts with a food product comprising an ingredient that the user does not like. The processor 102 may determine a haptic effect comprising a medium-magnitude vibration if the user interacts with a food product comprising an ingredient that the user is mildly allergic to. The processor 102 may determine a haptic effect comprising a high-magnitude vibration if the user interacts with a food product comprising an ingredient that the user is highly allergic to.

In some embodiments, the processor 102 may determine a haptic effect based on multiple criteria. For example, the processor 102 may determine if purchasing an object would align with the user's spending habits, e.g., based on the user's purchasing history. If the processor 102 determines that purchasing the object would not align with the user's spending habits, the processor 102 may determine a haptic effect comprising, e.g., a vibration. In some embodiments, the processor 102 may also determine how "confident" the processor 102 is (e.g., with what level of statistical accuracy the determination was made) that purchasing the object does not align with the user's spending habits. In one such embodiment, the processor 102 may determine the magnitude of the haptic effect based on the confidence level. For example, if the confidence level is high (e.g., greater than 80%), the processor 102 may determine that the vibration should have a large magnitude.

As another example, the processor 102 may determine the star rating of an object. In some embodiments, if the star rating is below three stars, the processor 102 may determine a haptic effect comprising a vibration. If the start rating is three or more stars, the processor 102 may determine a haptic effect comprising a stroking sensation. In some embodiments, the processor 102 may further determine if the object is within the user's budget. In one such embodiment, the processor 102 may determine the frequency of the haptic effect based on whether the object is within the user's budget. For example, if the object is within the user's budget, the processor 102 may determine that the haptic effect should have a low frequency. If the object is not within the user's budget, the processor 102 may determine that the haptic effect should have a high frequency. Thus, the user may be able to determine whether the object meets multiple criteria based on the characteristics of the haptic effect.

In some embodiments, the processor 102 determines a haptic effect based on the characteristic associated with the user interaction. For example, the processor 102 may determine the haptic effect based the type, location, duration, or other characteristics of the user interaction. For instance, the processor 102 may determine a haptic effect comprising a vibration if the user contacts a specific portion of a product, such as the nutritional label. As another example, the processor 102 may determine a haptic effect if the user interaction comprises a swipe along a surface of the object, and no haptic effect if the user interaction comprises tapping on the object.

In some embodiments, the computing device 101 may store associated "haptic profiles" in which a user can determine and save in memory 104 a "profile" of the haptic effects the user would like associated with particular characteristics of an object. For example, in one embodiment, a user can select from a list of options which haptic effect the user would like associated with the price, battery life, nutritional value, or material of an object. In some embodiments, the list may comprise, for example, haptic effects such as low magnitude vibration, pulsed vibration, high-magnitude vibration, or a simulated texture. In some embodiments, the processor 102 may consult with the user's haptic profile to determine which haptic effect to generate. For example, if the user's haptic profile associates locally produced products with a haptic effect comprising a low-frequency vibration, in response to the user contacting a locally made chocolate bar, the processor 102 may determine a haptic effect comprising a low-frequency vibration.

In some embodiments, the processor 102 may determine a default haptic effect. For example, if the processor 102 is unable to perform an operation (e.g., unable to determine a characteristic associated with a user interaction, a characteristic associated with an object, a criterion, whether a characteristic associated with an object matches the criterion, and/or a haptic effect), the processor 102 may determine a haptic effect comprising a vibration. This may alert the user that the operation could not be performed.

For example, the computing device 101 may be configured to output a jolt if the user interacts with a food item containing an allergen. The computing device 101 may be configured to output no haptic effect if the user interacts with a safe food item. In such an embodiment, if the processor 102 cannot determine the ingredients of a food item (e.g., because it cannot connect to the Internet), the processor 102 may determine a haptic effect comprising three pulsed vibrations. Thus, rather than the computing device 101 outputting no haptic effect, which could falsely lead the user to believe the food item is safe, the three pulsed vibrations can alert the user that the processor 102 was unable to determine the contents of the food. The user can then read the label or otherwise determine whether the food item has an allergen.

In some embodiments, the processor 102 determines a haptic effect that is configured to simulate the feeling of the object while in operation. For example, if the object comprises an electric drill, the haptic effect may comprise vibrations with magnitudes corresponding to the actual magnitude of vibrations generated by the drill while in operation. This may allow the user to perceive what operating the drill may actually feel like while in operation, and thereby make a smarter purchasing decision.

In some embodiments, the processor 102 determines a haptic effect that is configured to indicate (or simulate) the function of the object. For example, if the object comprises a car, the processor 102 may determine a haptic effect comprising a rumbling vibration, e.g., to simulate a car's engine. If the object comprises a bottle opener, the processor 102 may determine a haptic effect comprising a pop sensation, e.g., to simulate popping the top off a bottle. This may allow the user to determine the function of the object (e.g., without looking at the object).

In some embodiments, the processor 102 determines a haptic effect based on a characteristic of the user. For example, if the processor 102 determines that the user is a male, the processor 102 may determine a different haptic effect than if the processor 102 determines that the user is a female. As another example, the processor 102 may determine a haptic effect if the user is under 40 years old than if the user is over 40 years old. In this manner, haptic effects can be customized for different demographics, which may improve a user's response to the haptic effect.

In some embodiments, the processor 102 determines a haptic effect based on a position of the computing device 101 in real space or with respect to an object. For example, as the distance between the computing device 101 and the object increases, the haptic effect determination module 126 may determine a haptic effect comprising a decreasing magnitude. As the distance between the computing device 101 and the object decreases, the haptic effect determination module may determine a haptic effect comprising an increasing magnitude. Thus, the haptic effect may guide the user toward or away from an object, or indicate to the user how far the user is from the object.

In some embodiments, the processor 102 determines a plurality of haptic effects. Each of the plurality of haptic effects may be associated with a different characteristic of the object. For example, the processor 102 may determine a haptic effect associated with the size of the object (e.g., a long vibration, which may be configured to indicate that the object will fit within a pre-designated space). The processor 102 may also determine a haptic effect associated with the star rating of the object (e.g., a number of pulsed vibrations corresponding to the number of stars the object has). Based on the plurality of haptic effects, the user may be able to determine multiple characteristics of the object (e.g., that the object will fit in the user's house and has four stars), for example, without having to measure the object or browse for information about the object on the Internet (which may be tedious and time consuming).

In some embodiments, the processor 102 determines that a specific haptic effect has a higher priority than another haptic effect, and thus to output only the high priority effect. For example, in the above size and star rating example, the processor 102 may determine that the haptic effect associated with the size has a higher priority than other effects (e.g., the haptic effect associated with the star rating), and thus output only the size haptic effect. Alternatively, the processor 102 may determine that only the most intense effect should be output. Thus, in some embodiments, the processor 102 may determine a low intensity vibration and a high intensity vibration, but output only the high intensity vibration.

In some embodiments, the processor 102 may determine a haptic effect configured to make it easier or harder to interact with the object. For example, the object may be positioned on a shelf. Upon a user approaching the object, the processor 102 may determine that the object comprises a drug harmful to the user. Based on the harmful drug, the processor 102 may transmit a signal to a packaging computing device. The packaging computing device may receive the signal and output a haptic effect configured to lower the perceived coefficient of friction on the surface of the object's packaging. This may make it challenging for the user to grip or grasp the object to pick it up. Further, in some embodiments, the object (e.g., packaging of the object) may have a metal bottom. Based on the harmful drug, the processor 102 may transmit a signal to a shelf computing device. The shelf computing device may receive the signal and actuate an electromagnetic device configured to apply a strong magnetic field to the metal bottom of the object. This may make it challenging for the user to lift the object off the shelf (e.g., to purchase it).

As another example, the object may be deformed around another object, such as a shelf (e.g., to secure the object to the shelf). For instance, the shelf may comprise a bar around which the object is bent to secure the object to the bar. In some embodiments, upon the user interacting with the object, the processor 102 may transmit data (e.g., a purchase receipt code, name, credit card number, or customer identifier) to the object (e.g., another computing device 101 positioned in the object). The data may indicate that the user already purchased the item (e.g. online), or may otherwise be associated with a purchase of the product (e.g., the data may include a credit card number which the object may use to conduct the purchase in real time). Based on the data, the object may output a haptic effect configured to deform the shape of the object. For example, the object may output a haptic effect configured to unbend the object from around the bar (e.g., to de-secure the object from the shelf). This may allow the user to take the object.

In some embodiments, the object may be positioned on a shelf. A mechanical coupling device may be positioned between the object and the shelf. Upon a user approaching the object, the processor 102 may determine that the object has a negative characteristic (e.g., that the object comprises a chemical harmful to the user). The processor 102 may transmit a signal to the coupling device. Based on the signal, the coupling device may couple or latch to the object to the shelf, making it challenging for the user to lift the object.

The method 900 continues at step 914 when the processor 102 outputs the haptic effect. The processor 102 may transmit a haptic signal associated with the haptic effect to haptic output device 118, which outputs the haptic effect. The haptic effect may comprise a texture (e.g., sandy, bumpy, or smooth), a vibration, a change in a perceived coefficient of friction, a change in temperature, a stroking sensation, an electro-tactile effect, or a deformation (i.e., a deformation of a surface associated with the computing device 101).

Additionally or alternatively, in some embodiments, the computing device 101 may output a sound and/or information on a display. The sound and/or information may be associated with a characteristic of the object. For example, the user may tap on a toy. The computing device 101 may determine the name of the toy and, based on the name, whether the toy is a present on a holiday shopping list (e.g., input by the user, the user's family members, and/or the user's friends). If so, the computing device 101 may play a portion of a holiday song via a speaker. The computing device 101 may also output the name of the person (e.g., a friend or family member) associated with the toy on a display. For example, the computing device 101 may output "Vincent's present" on the display. If the holiday list includes presents for multiple people, or was made by a third party, this may help the user determine who the particular present is for.

Advantages of Object Manipulation with Haptic Feedback

There are numerous advantages to object manipulation with haptic feedback. Such systems may provide information about an object quickly and efficiently. For example, a user can tap on an object and substantially simultaneously receive information about the price or rating of an object (e.g., via haptic effects). This may be quicker and easier than, for example, looking up such information using a mobile device or consulting with a store employee.

In some embodiments, object manipulation with haptic feedback can guide a user toward making a good purchase or away from making a bad purchase. For example, a computing device may provide a user with positive haptic feedback (e.g., a light vibration or stroking sensation) if a food product conforms with a user's diet or negative haptic feedback (e.g., a shock or strong vibration) if the food product is harmful to the user's health. As another example, upon a user tapping on a product the user is interested in purchasing, the computing device can output a haptic effect configured to alert a user that the user already owns the product.

In some embodiments, object manipulation with haptic feedback can guide a user to a location associated with an object. For example, a nurse may be wearing a computing device comprising a ring. The nurse may pick up a bottle of medication and put it down in a location where it does not belong. Upon the nurse putting the medication down in the wrong location, the computing device may output a strong vibration to the nurse's finger. This may alert the nurse that the nurse has put the medication in the wrong location.

In some embodiments, object manipulation with haptic feedback can provide safety or medical information to a user. For example, a pharmacist may be holding a bottle of medication and move to pick up another bottle of medication. If the two would cause injury if mixed together or otherwise do not go together, the computing device may output a pulsed vibration. This may alert the pharmacist that the two medications should not be mixed or handled together.

In some embodiments, object manipulation with haptic feedback can improve branding and provide an enhanced marketing experience. For example, upon a user interacting with a product or a logo on the product, the computing device may output a haptic effect associated with the brand of the product. This may allow a user to identify the manufacturer of a product while not visually focused on the product. This may also generate a stronger relationship between the user and the brand.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computing device comprising:
   a sensor configured to detect an interaction with a physical object that is separate from the computing device and transmit a sensor signal associated with the interaction;
   a processor in communication with the sensor, the processor configured to:
      determine a characteristic of the physical object based on the sensor signal;
      responsive to determining that the characteristic of the physical object satisfies a criterion, the criterion based on a characteristic of a user, determine a haptic effect; and
      transmit a haptic signal associated with the haptic effect; and
   a haptic output device in communication with the processor, the haptic output device configured to receive the haptic signal and output the haptic effect.

2. The computing device of claim 1, wherein the criterion is generated by an application or is input by a third party.

3. The computing device of claim 2, wherein the criterion is based on an analysis of a purchasing history of the user.

4. The computing device of claim 1, wherein the processor is further configured to:
   determine the characteristic of the physical object based at least in part on one or more characteristics of the interaction.

5. The computing device of claim 4, wherein the interaction comprises a gesture through real space, and the processor is configured to determine the characteristic of the physical object based at least in part on a type of the gesture.

6. The computing device of claim 1, wherein the physical object comprises a product for sale in a physical location.

7. The computing device of claim 6, wherein the processor is further configured to determine the characteristic of the physical object by:
communicating, over a network, information associated with the physical object to a server; and
receiving, from the server, the characteristic of the physical object.

8. The computing device of claim 1, wherein the computing device is associated with a wearable device comprising a shoe, an armband, a sleeve, a jacket, glasses, a glove, a ring, a watch, a wristband, a bracelet, an article of clothing, a hat, a headband, or jewelry, or wherein the computing device is associated with a graspable device comprising a mobile phone, a tablet, an e-reader, a portable gaming device, a wand, a stylus, or a pen.

9. The computing device of claim 1, wherein the computing device is coupled to a shelf, a floor, or a carrying device.

10. The computing device of claim 1, wherein the haptic effect is configured to indicate that the characteristic of the physical object satisfies the criterion, and wherein the characteristic of the user is a preference of the user.

11. The computing device of claim 1, wherein the characteristic of the physical object comprises an ingredient, a dimension, a size, a shape, a brand, a manufacturer, a distributer, a producer, a color, a price, a rating, a logo, a label, a barcode, a name, nutritional information, a sale, a weight, a restriction, content, an expiration date, power consumption, a noise level, a return policy, a warranty, an allergen, a material, a chemical, function or utility, quantity, availability, electrical characteristic, a speed, or compatibility information associated with the physical object.

12. The computing device of claim 1, wherein the physical object is a person or an animal.

13. The computing device of claim 1, wherein the processor is configured to determine the characteristic of the physical object by wirelessly communicating with a remote device coupled to the physical object.

14. A method comprising:
receiving, by a processor of a computing device, a sensor signal from a sensor, wherein the sensor signal is associated with an interaction with a physical object that is separate from the computing device;
determining, by the processor, a characteristic associated with the physical object based on the sensor signal;
determining, by the processor, a haptic effect responsive to determining that the characteristic of the physical object satisfies a criterion, the criterion based on a characteristic of a user; and
causing, by the processor, the haptic effect to be output by a haptic output device.

15. The method of claim 14, wherein the criterion is generated by an application or is input by a third party.

16. The method of claim 14, further comprising:
determining the characteristic of the physical object based at least in part on one or more characteristics of the interaction.

17. The method of claim 14, wherein the physical object comprises a product for sale in a location, and further comprising determining the characteristic by:
communicating information associated with the physical object to a server over a network; and
receiving, from the server, the characteristic of the physical object.

18. The method of claim 14, wherein the sensor is associated with a wearable device comprising a shoe, an armband, a sleeve, a jacket, glasses, a glove, a ring, a watch, a wristband, a bracelet, an article of clothing, a hat, a headband, or jewelry, or wherein the sensor is associated with a graspable device comprising a mobile phone, a tablet, an e-reader, a portable gaming device, a wand, a stylus, or a pen.

19. The method of claim 14, wherein the sensor is coupled to a shelf, a floor, or a carrying device.

20. A non-transient computer readable medium comprising program code, which when executed by a processor is configured to cause the processor to:
receive a sensor signal from a sensor, wherein the sensor signal is associated with an interaction with a physical object that is separate from a computing device comprising the processor;
determine a characteristic associated with the physical object based on the sensor signal;
responsive to determining that the characteristic of the physical object satisfies a criterion, the criterion based on a characteristic of a user, determine a haptic effect; and
cause a haptic output device to output the haptic effect.

21. The non-transient computer readable medium of claim 20, further comprising program code, which when executed by the processor is configured to cause the processor to:
determine the characteristic of the physical object based at least in part on one or more characteristics of the interaction.

22. The non-transient computer readable medium of claim 20, wherein the sensor is coupled to a shelf, a floor, or a carrying device.

* * * * *